United States Patent
Combs et al.

(10) Patent No.: US 12,262,735 B2
(45) Date of Patent: Apr. 1, 2025

(54) DEGRADABLE CELLULOSE ESTER

(71) Applicant: ACETATE INTERNATIONAL LLC, Irving, TX (US)

(72) Inventors: Michael Combs, Pembroke, VA (US); Amber Miller, Narrows, VA (US); Cody Parker, Narrows, VA (US)

(73) Assignee: Acetate International LLC, Irving, TX (US)

( * ) Notice: Subject to any disclaimer, the term of this patent is extended or adjusted under 35 U.S.C. 154(b) by 2 days.

(21) Appl. No.: 18/094,642

(22) Filed: Jan. 9, 2023

(65) Prior Publication Data

US 2023/0157353 A1    May 25, 2023

Related U.S. Application Data

(62) Division of application No. 17/172,727, filed on Feb. 10, 2021, now Pat. No. 11,723,401.

(60) Provisional application No. 62/972,621, filed on Feb. 10, 2020.

(51) Int. Cl.
| | |
|---|---|
| *A24D 3/06* | (2006.01) |
| *A24D 3/04* | (2006.01) |
| *A24D 3/10* | (2006.01) |
| *A24D 3/14* | (2006.01) |
| *C08L 1/12* | (2006.01) |

(52) U.S. Cl.
CPC ............ *A24D 3/068* (2013.01); *A24D 3/048* (2013.01); *A24D 3/061* (2013.01); *A24D 3/10* (2013.01); *A24D 3/145* (2013.01); *C08L 1/12* (2013.01); *C08L 2201/06* (2013.01); *C08L 2203/12* (2013.01)

(58) Field of Classification Search
CPC ........ A24D 3/068; A24D 3/048; A24D 3/061; A24D 3/10; A24D 3/145; C08L 1/10; C08L 1/12; C08L 2201/06; C08L 2203/12; C08K 3/022; C08K 5/0033; C08K 9/08; C08K 9/10; C08K 3/012
See application file for complete search history.

(56) References Cited

U.S. PATENT DOCUMENTS

| | | |
|---|---|---|
| 2,740,775 A | 4/1956 | Karrer et al. |
| 5,084,296 A | 1/1992 | Lugay et al. |
| 7,585,441 B2 | 9/2009 | Caenen et al. |
| 7,610,852 B2 | 11/2009 | Bundren et al. |
| 8,397,733 B2 | 3/2013 | Robertson |
| 10,015,984 B2 | 7/2018 | Kondo |
| 2009/0151738 A1 | 6/2009 | Robertson et al. |
| 2010/0291245 A1 | 11/2010 | Gao et al. |
| 2011/0174324 A1 | 7/2011 | Robertson |
| 2013/0096297 A1 | 4/2013 | Combs et al. |

(Continued)

OTHER PUBLICATIONS

Sakai et al., "Biodegradation of Cellulose Acetate by Neisseria sicca," Biosci. Biotech. Biochem. 60 (10). 1617-1622, 1996, [online], retrieved from the Internet, [retrieved Feb. 3, 2023], URL:https://pubmed.ncbi.nlm.nih.gov/8987669/. (Year: 1996).

(Continued)

*Primary Examiner* — Dennis R Cordray
(74) *Attorney, Agent, or Firm* — Kilpatrick Townsend & Stockton LLP

(57) ABSTRACT

Disclosed herein is a degradable cellulose ester. The cellulose ester may be formed into tow for use in cigarette filters or into articles, such as molded articles. A basic material, an enzymatic material, or combinations thereof is included in the cellulose ester in order to degrade the cellulose ester.

13 Claims, 4 Drawing Sheets

(56) References Cited

U.S. PATENT DOCUMENTS

| | | |
|---|---|---|
| 2013/0115452 A1 | 5/2013 | Bundren et al. |
| 2013/0220349 A1 | 8/2013 | Roberston et al. |
| 2015/0128964 A1 | 5/2015 | Bundren et al. |

OTHER PUBLICATIONS

U.S. Appl. No. 17/172,727, Non-Final Office Action mailed Feb. 9, 2023, 16 pages.

U.S. Appl. No. 17/172,727, Notice of Allowance mailed Mar. 22, 2023, 8 pages.

DEGRADABLE CELLULOSE ESTER

CROSS REFERENCE TO RELATED APPLICATION

This application is a divisional of U.S. application Ser. No. 17/172,727, filed Feb. 10, 2021, which claims the benefit of and priority to U.S. Provisional Application No. 62/972,621, filed on Feb. 10, 2020, the entire contents and disclosure of which is hereby incorporated by reference.

FIELD OF THE INVENTION

The present invention relates generally to methods for degrading a cellulose ester, such as cellulose acetate, by inclusion of a basic material, an enzymatic material, or combinations of a basic and enzymatic material in the cellulose ester. In particular, the present invention relates to including a coated basic and/or enzymatic material in a cellulose ester tow or article.

BACKGROUND OF THE INVENTION

Cellulose esters are widely used for many purposes, including in molded articles and as cellulose acetate tow in cigarette filters. Although cellulose esters such as cellulose acetate are biopolymers known to degrade, the rate of degradation is slower than natural cellulose. For example, cigarette filters may take up to 15 years to degrade because cellulose acetate does not degrade until sufficient acetyl groups have been removed, allowing for microorganisms to recognize the material for degradation. After smoking, the filters are often discarded in the environment and are one of the most common forms of man-made litter in the world. An estimated 4.5 trillion cigarette filters become litter each year. Due to the degradation time of cellulose acetate and to the plasticizer contained in the filter, the litter remains longer than desirable. Although attempts have been made to form biodegradable filters comprising cellulose acetate, these attempts have been unsuccessful for a variety of reasons, including an undesirable change to the taste of the cigarette due to modifications and/or additives and degradation time not being sufficiently reduced. Molded articles made of cellulose esters suffer from similar deficiencies.

U.S. Pat. No. 5,084,296, incorporated herein by reference, discloses a composition comprises a cellulose acetate or other cellulose ester, and an anatase-type titanium oxide having (1) a specific surface area of not less than 30 m$^2$/g, (2) a primary particle size of 0.001 to 0.07 μm, or (3) a specific surface area of not less than 30 m2/g and a primary particle size of 0.001 to 0.07 μm. For improving the photodegradability and the dispersibility, the surface of the titanium oxide may be treated with a phosphoric acid salt or other phosphorus compound, a polyhydric alcohol, an amino acid or others. Use of a low-substituted cellulose ester with an average substitution degree not exceeding 2.15 insures high biodegradability. The composition may further contain a plasticizer and/or an aliphatic polyester, a biodegradation accelerator (e.g. organic acids or esters thereof). The degradable cellulose ester composition is highly photodegradable and moldable and hence useful for the manufacture of various articles.

U.S. Pat. No. 8,397,733, incorporated herein by reference, discloses a degradable cigarette filter which includes a filter element of a bloomed cellulose acetate tow and a plug wrap surrounding the filter element, and a pill dispersed in the tow. The pill includes a material adapted to catalyze hydrolysis of the cellulose acetate tow that is encapsulated with an inner layer of a water soluble or water permeable material and an outer layer of a cellulose acetate having a D.S. in the range of 2.0-2.6.

US Patent Publication No. 2009/0151738, incorporated herein by reference, discloses a degradable cigarette filter that includes a filter element of a bloomed cellulose acetate tow, a plug wrap surrounding the filter element, and either a coating or a pill in contact with the tow. The coating and/or pill may be composed of a material adapted to catalyze hydrolysis of the cellulose acetate tow and a water-soluble matrix material. The material may be an acid, an acid salt, a base, and/or a bacterium adapted to generate an acid. The coating may be applied to the tow, the plug wrap, or both. The pill may be placed in the filter element. When water contacts the water-soluble matrix material, the material adapted to catalyze hydrolysis is released and catalyzes the hydrolysis, and subsequent degradation, of the cellulose acetate tow. The foregoing is also applicable to articles made of cellulose esters.

Accordingly, there is a need for the controlled and sustained release of a material that will aid the degradation of cellulose esters used in articles and cigarette filters.

SUMMARY OF THE INVENTION

In some aspects, the present disclosure is directed to a degradable cellulose ester article comprising a cellulose ester having a degree of substitution of greater than 1.3, wherein at least a portion of the article comprises a basic material, an enzymatic material, or combinations thereof. The cellulose ester may comprise cellulose acetate, cellulose butyrate, cellulose propionate, cellulose triacetate, cellulose acetate-propionate, cellulose acetate-butyrate, cellulose propionate-butyrate, cellulose nitrate, cellulose sulfate, cellulose phthalate, and combinations thereof. In some aspects, the basic material, enzymatic material, or combinations thereof may be provided as a coating on the cellulose ester article. In other aspects, the basic material, enzymatic material, or combinations thereof may provided as a pill within the degradable cellulose ester article. The pill may comprise a coating. The basic material may have a pH of at least 7.4, preferably at least 7.6. The basic material may comprise at least one of calcium oxide, calcium hydroxide, magnesium hydroxide, magnesium oxide, or combinations thereof. The pill may comprise a basic material and an enzymatic material, and wherein the enzymatic material comprises an esterase, a cellulase, a glucosidase, or combinations thereof. The enzymatic material may comprise an esterase. The coating of the pill may comprise the basic material. The pill may comprise the enzymatic material and the enzymatic material may be coated with a second coating material. The pill may comprise an enzymatic material comprising an esterase and at least one of a cellulase, a glucosidase, or combinations thereof. The coating material may have a water solubility of at least 0.01 g/100 mL at 25° C. The coating material may comprise gelatin, polyethylene glycol, polylactic acid, polycaprolactone, polyvinyl pyrrolidone, polyvinyl alcohol or combinations thereof. The coating material may comprise an oligosaccharide, a monosaccharide, a polyhydroxyalkanoate, or combinations thereof. The coating material may be free of cellulose acetate. The second coating material may comprise gelatin, polyethylene glycol, polylactic acid, polycaprolactone, polyvinyl pyrrolidone, polyvinyl alcohol or combinations thereof. The second coating material may comprise an oligosaccharide, a monosaccharide, and/or a polyhydroxyalkanoate. The pill, when exposed to water, may deacetylate the bloomed cellulose acetate tow by at least 20% in 20 days or less, preferably by at least 30%, more preferably by at least 60%.

In some aspects, the present disclosure is directed to a degradable cigarette filter comprising: a filter element comprising bloomed cellulose acetate tow, wherein the cellulose acetate has a degree of substitution (DS) of greater than 1.3; a pill dispersed in the bloomed cellulose acetate tow; and a plug wrap at least partially surrounding the filter element; wherein the pill comprises a coating and at least one of a basic material, an enzymatic material, or a combination thereof, and wherein the pill, when exposed to water, deacetylates the bloomed cellulose acetate tow by at least 10% in 20 days or less. The water solubility of the basic material is less than the water solubility of the coating. The basic material may have a pH of at least 7.4, preferably at least 7.6. The basic material may comprise at least one of calcium oxide, calcium hydroxide, magnesium hydroxide, magnesium oxide, or combinations thereof. The pill may comprise a basic material and an enzymatic material, and wherein the enzymatic material comprises an esterase, a cellulase, a glucosidase, or combinations thereof. The enzymatic material may comprise an esterase. The coating may have a thickness from 0.1 to 100 µm. The pill may have a size, in its largest diameter, from 1 to 10 mm. The coating of the pill may comprise the basic material. The pill may comprise the enzymatic material and wherein the enzymatic material is coated with a second coating material. The pill may comprise an enzymatic material comprising an esterase and at least one of a cellulase, a glucosidase, or combinations thereof. The coating material may have a water solubility of at least 0.01 g/100 mL at 25° C. The coating material may comprise gelatin, polyethylene glycol, polylactic acid, polycaprolactone, polyvinyl pyrrolidone, polyvinyl alcohol or combinations thereof. The coating material may comprise an oligosaccharide, a monosaccharide, a polyhydroxyalkanoate, or combinations thereof. The coating material may be free of cellulose acetate. The second coating material may comprise gelatin, polyethylene glycol, polylactic acid, polycaprolactone, polyvinyl pyrrolidone, polyvinyl alcohol or combinations thereof. The second coating material may comprise an oligosaccharide, a monosaccharide, and/or a polyhydroxyalkanoate. The pill, when exposed to water, may deacetylate the bloomed cellulose acetate tow by at least 20% in 20 days or less, preferably by at least 30%, more preferably by at least 60%.

In some aspects, the present disclosure is directed to a degradable cellulose acetate tow, wherein the cellulose acetate tow has a degree of substitution of greater than 1.3 and wherein the cellulose acetate tow further comprises a pill dispersed in the cellulose acetate tow, wherein the pill comprises a coating and at least one of a basic material, an enzymatic material, or a combination thereof, and wherein the pill, when exposed to water, deacetylates the cellulose acetate tow by at least 10% in 20 days or less.

In some aspects, the present disclosure is directed to a method for forming degradable cellulose acetate tow, the method comprising: a) providing cellulose acetate tow having a degree of substitution of greater than 1.3; b) dispersing a pill in the cellulose acetate tow, wherein the pill comprises at least one of a basic material, and enzymatic material, or a combination thereof, wherein the pill, when exposed to water, deacetylates the cellulose acetate tow by at least 10% in 20 days or less. The pill may hydrolyze the acetate moieties and cleaves glycosidic bonds within the cellulose acetate tow.

In some aspects, the present disclosure is directed to a method for forming a degradable cellulose ester article, the method comprising: a) providing cellulose ester having a degree of substitution of greater than 1.3; b) dispersing a pill in the cellulose ester, wherein the pill comprises at least one of a basic material, and enzymatic material, or a combination thereof, wherein the pill, when exposed to water, deacetylates the cellulose ester by at least 10% in 20 days or less.

In some aspects, the present disclosure is directed to a method for forming a degradable cellulose ester article, the method comprising: a) forming a cellulose ester article from a cellulose ester having a degree of substitution of greater than 1.3; and b) providing a coating on at least a portion of the cellulose ester article, wherein the coating comprises a basic material, an enzymatic material, or combinations thereof.

In some aspects, the present disclosure is directed to a method for forming a degradable cellulose ester article, the method comprising: a) providing a cellulose ester having a degree of substitution of greater than 1.3; b) providing a basic material, an enzymatic material, or combinations thereof and c) forming a cellulose ester article by at least one of extrusion, thermoforming, blow molding, 3D printing, injection molding, and combinations thereof.

DESCRIPTION OF THE DRAWINGS

The present invention will be better understood in view of the appended, non-limiting figure, wherein.

DETAILED DESCRIPTION OF THE INVENTION

Introduction

Figure 1:
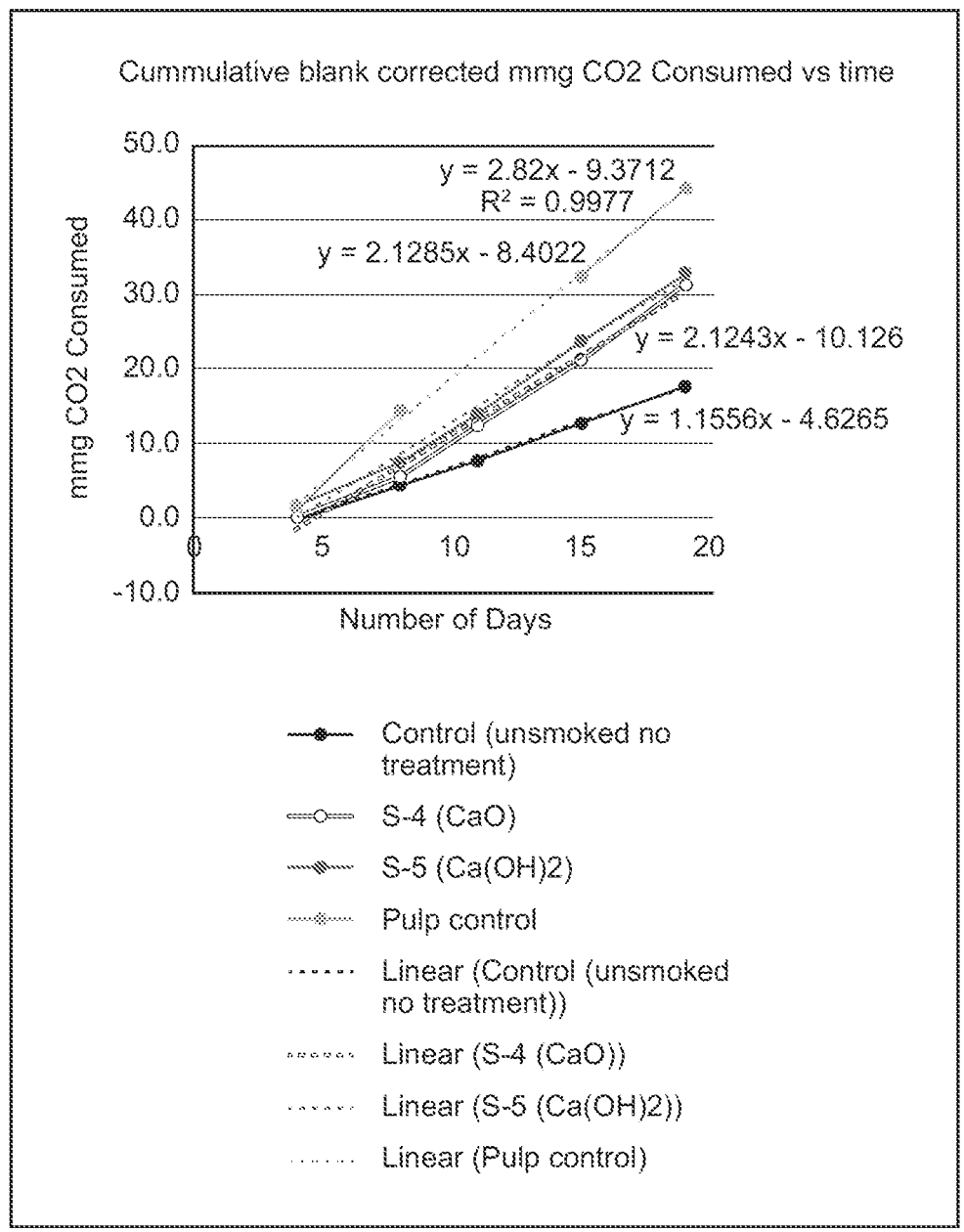
FIG. 1 shows test results for total degradation in accordance with the present disclosure.

The present disclosure is directed to forming biodegradable cellulose esters from cellulose esters having a degree of substitution of greater than 1.3 by using a basic material, an enzymatic material, or combinations thereof. In some aspects, the present disclosure is directed to a cellulose ester article, wherein the basic material, enzymatic materials, or combinations thereof is included as a coating on the cellulose ester article. In further aspects, the present disclosure is directed to forming a portion of the cellulose ester article from the basic material, the enzymatic materials, or combinations thereof. In yet further aspects, the present disclosure is directed to including a pill comprising the basic material, enzymatic materials, or combinations thereof in the cellulose ester article.

The present disclosure is also directed to providing a pill in a cellulose acetate tow having a degree of substitution of greater than 1.3 in order to degrade the cellulose acetate tow. In some aspects, the pill is included in a degradable cigarette filter formed from cellulose acetate tow.

Regardless of whether a pill, coating, or portion of the cellulose ester article being formed from the basic materials, enzymatic materials, or combinations thereof, is used, the degradable cellulose acetate tow or cellulose ester article degrades by at least 10% in 20 days or less.

In addition to the partial degradation of at least 10%, the degradable tow, filters, and articles described herein have a total degradation value of over 80%, e.g., over 85%, over 90%, or even over 95%. Such a total degradation allows the cellulose acetate or other cellulose ester to degrade like cellulose, opening up possibilities for recycling the articles once they have been degraded to cellulose. Total degradation may be measured by measuring mg $CO_2$ production according to ISO 19679 (2016).

As explained in the background section, the inclusion of pills in cellulose acetate tow has been proposed but those methods have limitations and are only proposed for cigarette filters and not for the broader class of cellulose ester articles. The basic mechanism of cellulose ester degradation is dependent on the degree of substitution ("DS") of the cellulose ester. DS of cellulose ester refers to the degree of substitution and may be measured, for example for cellulose acetate, by ASTM 871-96 (2010). When the cellulose acetate has a DS of greater than 1.3, cellulose acetate is not degraded by naturally occurring enzymes or bacteria due to the acetate moieties present. To replace the acetate moieties with hydroxyl moieties, and thereby reduce the DS, the cellulose acetate is hydrolyzed. Hydrolysis of the acetyl moieties is also referred to as deacetylation. The degradable cigarette filters described herein typically have a DS of greater than 1.3, often in the range of 2.0 to 2.6. The filters comprise a filter element comprising bloomed cellulose acetate tow, a pill dispersed in the bloomed cellulose acetate tow, and a plug wrap at least partially surrounding the filter element. The pill may comprise at least one of a basic material, an enzymatic material, or a combination thereof. The pill, when exposed to water, may deacetylate the bloomed cellulose acetate tow by at least 10% in 20 days or less. The basic and/or enzymatic material may be added in various amounts as described herein, including on a weight percent basis or on a mg basis. As described further in the examples, the basic and/or enzymatic material may be added in an amount from 0.1 to 50 mg, e.g. om from 1 to 40 mg, from 5 to 40 mg, from 5 to 30 mg, from 5 to 20 mg, or any values or ranges there between. The filters described herein therefore degrade more rapidly than other known cellulose acetate tow filters.

Cellulose Ester

As described herein, the present disclosure relates to including a basic material, an enzymatic material, or combinations thereof in a cellulose ester, e.g., a cellulose ester article, a cellulose acetate tow, or a cigarette filter formed from cellulose acetate tow. The basic material, enzymatic material, or combinations thereof is included with the cellulose ester in order to hydrolyze the cellulose ester and aid degradation. Cellulose acetate, as used herein, refers to cellulose diacetate, though the pill and methods described herein may be used for other types of cellulose esters, including cellulose triacetate, cellulose propionate, cellulose acetate-propionate, cellulose butyrate, cellulose acetate-butyrate, cellulose propionate-butyrate, cellulose nitrate, cellulose sulfate, cellulose phthalate and combinations thereof.

Cellulose esters may be prepared by known processes, including those disclosed in U.S. Pat. No. 2,740,775 and in U.S. Publication No. 2013/0096297, the entireties of which are incorporated herein by reference. Typically, acetylated cellulose is prepared by reacting cellulose with an acetylating agent in the presence of a suitable acidic catalyst and then de-esterifying.

The cellulose may be sourced from a variety of materials, including cotton linters, a softwood or from a hardwood. Softwood is a generic term typically used in reference to wood from conifers (i.e., needle-bearing trees from the order Pinales). Softwood-producing trees include pine, spruce, cedar, fir, larch, douglas-fir, hemlock, cypress, redwood and yew. Conversely, the term hardwood is typically used in reference to wood from broad-leaved or angiosperm trees. The terms "softwood" and "hardwood" do not necessarily describe the actual hardness of the wood. While, on average, hardwood is of higher density and hardness than softwood, there is considerable variation in actual wood hardness in both groups, and some softwood trees can actually produce wood that is harder than wood from hardwood trees. One feature separating hardwoods from softwoods is the presence of pores, or vessels, in hardwood trees, which are absent in softwood trees. On a microscopic level, softwood contains two types of cells, longitudinal wood fibers (or tracheids) and transverse ray cells. In softwood, water transport within the tree is via the tracheids rather than the pores of hardwoods. In some aspects, a hardwood cellulose is preferred for acetylating.

Acylating agents can include both carboxylic acid anhydrides (or simply anhydrides) and carboxylic acid halides, particularly carboxylic acid chlorides (or simply acid chlorides). Suitable acid chlorides can include, for example, acetyl chloride, propionyl chloride, butyryl chloride, benzoyl chloride and like acid chlorides. Suitable anhydrides can include, for example, acetic anhydride, propionic anhydride, butyric anhydride, benzoic anhydride and like anhydrides. Mixtures of these anhydrides or other acylating agents can also be used in order to introduce differing acyl groups to the cellulose. Mixed anhydrides such as, for example, acetic propionic anhydride, acetic butyric anhydride and the like can also be used for this purpose in some embodiments.

In most cases, the cellulose is exhaustively acetylated with the acetylating agent to produce a derivatized cellulose having a high degree of substitution (DS) value, such as from 2.4 to 3, along with some additional hydroxyl group substitution (e.g., sulfate esters) in some cases. Exhaustively acetylating the cellulose refers to an acetylation reaction that is driven toward completion such that as many hydroxyl groups as possible in cellulose undergo an acetylation reaction.

Suitable acidic catalysts for promoting the acetylation of cellulose often contain sulfuric acid or a mixture of sulfuric acid and at least one other acid. Other acidic catalysts not containing sulfuric acid can similarly be used to promote the acetylation reaction. In the case of sulfuric acid, at least some of the hydroxyl groups in the cellulose can become initially functionalized as sulfate esters during the acetylation reaction. Once exhaustively acetylated, the cellulose is then subjected to a controlled partial de-esterification step, generally in the presence of a de-esterification agent, also referred to as a controlled partial hydrolysis step.

De-esterification, as used herein, refers to a chemical reaction during which one or more of the ester groups of the intermediate cellulosic ester are cleaved from the cellulose acetate and replaced with a hydroxyl group, resulting in a cellulose acetate product having a (second) DS of less than 3. "De-esterifying agent," as used herein, refers to a chemical agent capable of reacting with one or more of the ester groups of the cellulose acetate to form hydroxyl groups on the intermediate cellulosic ester. Suitable de-esterifying agents include low molecular weight alcohols, such as methanol, ethanol, isopropyl alcohol, pentanol, R—OH, wherein R is C1 to C20 alkyl group, and mixtures thereof. Water and a mixture of water and methanol may also be used as the de-esterifying agent. Typically, most of these sulfate esters are cleaved during the controlled partial hydrolysis used to reduce the amount of acetyl substitution. The reduced degree of substitution may range from 0.5 to 3.0, e.g., from 1.3 to 3, from 1.3 to 2.9, from 1.5 to 2.9 or from 2 to 2.6. For purposes of this disclosure, the degree of substitution is typically from 1.3 to 2.9 since below 1.3, natural degradation may occur. The degree of substitution may be selected based on the at least one organic solvent to be used in the binder composition. For example, when acetone is used as the organic solvent, the degree of substitution may range from 2.2 to 2.65.

The number average molecular weight of the cellulose ester may range from 30,000 amu to 100,000 amu, e.g., from 50,000 amu to 80,000 amu and may have a polydispersity from 1.5 to 2.5, e.g., from 1.75 to 2.25 or from 1.8 to 2.2. All molecular weight recited herein, unless otherwise specified, are number average molecular weights. The molecular weight may be selected based on the desired hardness of the final tow or filter rod. Although greater molecular weight leads to increased hardness, greater molecular weight also increases viscosity. The cellulose ester may be provided in powder or flake form.

In some aspects, blends of different molecular weight cellulose ester flake or powder may be used. Accordingly, a blend of high molecular weight cellulose ester, e.g., a cellulose ester having a molecular weight above 60,000 amu, may be blended with a low molecular weight cellulose ester, e.g., a cellulose ester having a molecular weight below 60,000 amu. The ratio of high molecular weight cellulose ester to low molecular weight cellulose ester may vary but may generally range from 1:10 to 10:1; e.g., from 1:5 to 5:1 or from 1:3 to 3:1. Blends of different cellulose esters may also be used and may include two, three, four, or more different cellulose esters in varied ratios. In some aspects, one cellulose ester may be present in a majority while other cellulose esters are present in smaller amounts.

Cellulose Acetate Fibers, Tow, and Tow Bales

There are a number of methods of forming fibers from cellulose acetate which may be employed to form the cellulose acetate fibers of the present disclosure. In some embodiments, to form fibers from cellulose ester, a dope is formed by dissolving the cellulose ester in a solvent to form a dope solution. The dope solution is typically a highly viscous solution. The solvent of the dope solution may be selected from the group consisting of water, acetone, methylethyl ketone, methylene chloride, dioxane, dimethyl formamide, methanol, ethanol, glacial acetic acid, supercritical carbon dioxide, any suitable solvent capable of dissolving the aforementioned polymers, and combinations thereof. In some aspects, the solvent is acetone or a combination of acetone and up to 5 wt. % water. Pigments may also be added to the dope. The dope may comprise, for example, from 10 to 40 wt. % cellulose acetate and from 60 to 90 wt. % solvent. Pigments, when added, may be present from 0.1 to 5 wt. %, e.g., from 0.1 to 4 wt. %, from 0.1 to 3 wt. % from 0.1 to 2 wt. %, from 0.5 to 5 wt. %, from 0.5 to 4 wt. %, from 0.5 to 3 wt. %, from 0.5 to 2 wt. %, from 1 to 5 wt. %, from 1 to 4 wt. %, from 1 to 3 wt. % or from 1 to 2 wt. %. The dope is then filtered and deaerated prior to being spun to form fibers. The dope may be spun in a spinner comprising one or more cabinets, each cabinet comprising a spinneret. The spinneret comprises holes that affect the rate at which the solvent evaporates from the fibers.

The pigment added to the dope is not particularly limited, and any conventional pigment may be used. Examples of common, suitable pigments include calcium carbonate, diatomaceous earth, magnesium oxide, zinc oxide, and barium sulfate.

Generally, the production of a bale of tow bands may involve spinning fibers from the dope, forming a tow band from the fibers, crimping the tow band, and baling the crimped tow band. Within said production, optional steps may include, but are not limited to, warming the fibers after spinning, applying a finish or additive to the fibers and/or tow band prior to crimping, and conditioning the crimped tow band. The parameters of at least these steps are important for producing desirable bales.

It should be noted that bales may vary in size and shape as needed for further processing. In some embodiments, bales may have dimensions ranging from 30 inches (76 cm) to 60 inches (152 cm) in height, 46 inches (117 cm) to 56 inches (142 cm) in length, and 35 inches (89 cm) to 45 inches (114 cm) in width. In some embodiments, bales may range in weight from 900 pounds (408 kg) to 2100 pounds (953 kg). In some embodiments, bales may have a density greater than 300 kg/m3 (18.8 lb/ft3).

Fibers

The structure of the cellulose acetate fibers for use in the present disclosure is not particularly limited, and various known fiber structures may be employed. For example, the tow band may utilize fibers having a broad range of denier per filament (dpf). In some embodiments, the tow band has from 1 to 30 dpf, e.g., from 2 to 28 dpf, from 3 to 25 dpf, from 4 to 22 dpf, from 5 to 30 dpf, from 5 to 28 dpf, from 5 to 25 dpf, from 5 to 22 dpf, from 10 to 30 dpf, from 10 to 28 dpf, from 10 to 25 dpf, from 10 to 22 dpf, from 15 to 30 dpf, from 15 to 28 dpf, from 15 to 25 dpf, from 15 to 22 dpf, from 20 to 30 dpf, from 20 to 28 dpf, from 20 to 25 dpf, or from 20 to 22 dpf.

The fibers for use in the present disclosure may have any suitable cross-sectional shape, including, but not limited to, circular, substantially circular, crenulated, ovular, substantially ovular, polygonal, substantially polygonal, dog-bone, "Y," "X," "K," "C," multi-lobe, and any hybrid thereof. As used herein, the term "multi-lobe" refers to a cross-sectional shape having a point (not necessarily in the center of the cross-section) from which at least two lobes extend (not necessarily evenly spaced or evenly sized).

As noted above, fibers for use in the present disclosure may be produced by any method known to one skilled in the art. As noted, in some embodiments, fibers may be produced by spinning a dope through a spinneret. As used herein, the term "dope" refers to a cellulose acetate solution and/or suspension from which fibers are produced. In some embodiments, a dope may comprise cellulose acetate and solvents. In some embodiments, a dope for use in conjunction with the present disclosure may comprise cellulose acetate, solvents, and additives. In some embodiments, the cellulose acetate may be at a concentration in the dope ranging from 10 to 40 wt. percent (e.g., from 20 to 30 wt. %, from 25 to 40 wt. %, from 25 to 30 wt. %), and the solvent may be at a concentration from 60 to 90 wt. % (e.g., 60 to 80 wt. %, 70 to 80 wt. %, 80 to 90 wt. %). In some embodiments, the dope may be heated to a temperature ranging from 40° C. to 100° C. (e.g., from 45° C. to 95° C., from 50° C. to 90° C., from 55° C. to 85° C., from 60° C. to 80° C.).

Suitable solvents may include, but not be limited to, water, acetone, methylethyl ketone, methylene chloride, dioxane, dimethyl formamide, methanol, ethanol, glacial acetic acid, supercritical CO2, any suitable solvent capable of dissolving the aforementioned polymers, or any combination thereof. By way of nonlimiting example, a solvent for cellulose acetate may be an acetone/methanol mixture. In some embodiments, to produce very high dpf values of the present disclosure, increased solvent levels compared with amounts for typical dpf values (e.g., 2 to 8 dpf) may be used. For example in some embodiments, to produce very high dpf tow, solvent amounts may be from 5 to 30 wt. % greater when compared with solvent amounts for typical dpf tow. Additional solvent amounts may, in some cases, present challenges to the processing of the fibers.

Some embodiments of the present disclosure may involve treating fibers to achieve surface functionality on the fibers. In some embodiments, fibers may comprise a surface functionality including, but not limited to, biodegradability sites (e.g., defect sites to increase surface area to enhance biodegradability), chemical handles (e.g., carboxylic acid groups for subsequent functionalization), active particle binding sites (e.g., sulfide sites binding gold particles or chelating groups for binding iron oxide particles), sulfur moieties, or any combination thereof. One skilled in the art should understand the plurality of methods and mechanisms to achieve surface functionalities. Some embodiments may involve dipping, spraying, ionizing, functionalizing, acidizing, hydrolyzing, exposing to a plasma, exposing to an ionized gas, or any combination thereof to achieve surface functionalities. Suitable chemicals to impart a surface functionality may be any chemical or collection of chemicals capable of reacting with cellulose acetate including, but not limited to, acids (e.g., sulfuric acid, nitric acid, acetic acid, hydrofluoric acid, hydrochloric acid, and the like), reducing agents (e.g., LiAlH4, NaBH4, H2/Pt, and the like), Grignard reagents (e.g., CH3MgBr, and the like), trans-esterification reagent, amines (e.g., R—NH3 like CH3NH3), or any combination thereof. Exposure to plasmas and/or ionized gases may react with the surface, produce defects in the surface, or any combination thereof. Said defects may increase the surface area of the fibers which may yield higher loading and/or higher filtration efficacy in the final filter products.

Some embodiments of the present disclosure may involve applying a finish to the fibers. Suitable finishes may include, but not be limited to, at least one of the following: oils (e.g., mineral oils or liquid petroleum derivatives), water, additives, or any combination thereof. Examples of suitable mineral oils may include, but not be limited to, water white (i.e., clear) mineral oil having a viscosity of 80-95 SUS (Sabolt Universal Seconds) measured at 38° C. (100° F.). Examples of suitable emulsifiers may include, but not be limited to, sorbitan monolaurate, e.g., SPAN® 20 (available from Croda, Wilmington, Del.), poly(ethylene oxide) sorbitan monolaurate, e.g., TWEEN® 20 (available from Croda, Wilmington, Del.). The water may be de-mineralized water, de-ionized water, or otherwise appropriately filtered and treated water. The lubricant or finish may be applied by spraying or wiping. Generally, the lubricant or finish is added to the fiber prior to forming the fibers into tow.

In some embodiments of the present disclosure, finish may be applied as a neat finish or as a finish emulsion in water. As used herein, the term "neat finish" refers to a finish formulation without the addition of excess water. It should be noted that finish formulations may comprise water. In some embodiments, finish may be applied neat followed by applying water separately.

In some embodiments of the present disclosure, a finished emulsion may comprise less than 98% water, less than 95%, less than 92%, or less than 85%. In some embodiments, it may be advantageous in later steps to have fibers having a lower weight percentage of moisture (e.g., 5% to 25% w/w of the tow band), of which water is a contributor. The water content of the finished emulsion may be at least one parameter that may assist in achieving said weight percentage of moisture in the fibers. Therefore, in some embodiments, a finished emulsion may comprise less than 92% water, less than 85% water, or less than 75% water.

Tow

The present disclosure preferably includes forming tow bands from a plurality of fibers. In some embodiments, the tow band is from 10,000 to 100,000 total denier, e.g., from 15,000 to 100,000, from 20,000 to 100,000, from 25,000 to 100,000, from 30,000 to 100,000, from 10,000 to 90,000, from 15,000 to 90,000, from 20,000 to 90,000, from 25,000 to 90,000, from 30,000 to 90,000, from 10,000 to 90,000, from 15,000 to 90,000, from 20,000 to 90,000, from 25,000 to 90,000, from 30,000 to 90,000, from 10,000 to 80,000, from 15,000 to 80,000, from 20,000 to 80,000, from 25,000 to 80,000, from 30,000 to 80,000, from 10,000 to 70,000, from 15,000 to 70,000, from 20,000 to 70,000, from 25,000 to 70,000, from 30,000 to 70,000, from 10,000 to 60,000, from 15,000 to 60,000, from 20,000 to 60,000, from 25,000 to 60,000, or from 30,000 to 60,000. In terms of upper limits, the tow band may be less than 100,000 total denier, e.g., less than 90,000, less than 80,000, less than 70,000, or less than 60,000. In terms of lower limits, the tow band may be greater than 10,000 total denier, e.g., greater than 15,000, greater than 20,000, greater than 25,000, or greater than 30,000.

In some embodiments, the tow can have a breaking strength between 3.5 kg and 25 kg, e.g. from 3.5 kg to 22.5 kg, from 3.5 kg to 20 kg, from 3.5 kg to 17.5 kg, from 3.5 kg to 15 kg, from 4 kg to 25 kg, from 4 kg to 22.5 kg, from 4 kg to 20 kg, from 4 kg to 17.5 kg, from 4 kg to 15 kg, from 4.5 kg to 25 kg, from 4.5 kg to 22.5 kg, from 4.5 kg to 20 kg, from 4.5 kg to 17.5 kg, from 4.5 kg to 15 kg, from 5 kg to 25 kg, from 5 kg to 22.5 kg, from 5 kg to 20 kg, from 5 kg to 17.5 kg, or from 5 kg to 15 kg. In terms of upper limits, the tow may have a breaking strength of less than 25 kg, e.g., less than 22.5 kg, less than 20 kg, less than 17.5 kg, or less than 15 kg. In terms of lower limits, the tow may have a breaking strength of greater than 3.5 kg, e.g. greater than 4 kg, greater than 4.5 kg, or greater than 5 kg.

In some embodiments of the present disclosure, a tow band may comprise more than one type of fiber. In some embodiments, the more than one type of fiber may vary based on dpf, cross-sectional shape, composition, treatment prior to forming the tow band, or any combination thereof. Examples of suitable additional fibers may include, but are not limited to, carbon fibers, activated carbon fibers, natural fibers, synthetic fibers, or any combination thereof.

Some embodiments of the present disclosure may include crimping the tow band to form a crimped tow band. Crimping the tow band may involve using any suitable crimping technique known to those skilled in the art. These techniques may include a variety of apparatuses including, but not limited to, a stuffer box or a gear. Nonlimiting examples of crimping apparatuses and the mechanisms by which they work can be found in U.S. Pat. Nos. 7,610,852 and 7,585,441, the entire contents and disclosures of which are incorporated herein by reference. Suitable stuffer box crimpers may have smooth crimper nip rolls, threaded or grooved crimper nip rolls, textured crimper nip rolls, upper flaps, lower flaps, or any combination thereof.

The configuration of the crimp may play a role in the processability of the final bale. Examples of crimp configurations may include, but not be limited to, lateral, vertical, some degree between lateral and vertical, random, or any combination thereof. As used herein, the term "lateral" when describing crimp orientation refers to crimp or fiber bends in the plane of the tow band. As used herein, the term "vertical" when describing a crimp orientation refers to crimp projecting outside of the plane of the tow band and perpendicular to the plane of the tow band. It should be noted that the terms lateral and vertical refer to general overall crimp orientation and may have deviation from said configuration by +/−30 degrees.

In some embodiments of the present disclosure, a crimped tow band may comprise fibers with a first crimp configuration and fibers with a second crimp configuration.

In some embodiments of the present disclosure, a crimped tow band may comprise fibers with at least a vertical crimp configuration near the edges and fibers with at least a lateral crimp configuration near the center. In some embodiments, a crimped tow band may comprise fibers with a vertical crimp configuration near the edges and fibers with a lateral crimp configuration near the center.

The configuration of the crimp may be important for the processability of the final bale in subsequent processing steps, e.g., a lateral crimp configuration may provide better cohesion of fibers than a vertical crimp configuration unless further steps are taken to enhance cohesion. Methods for crimping tow bands with a substantially later crimp configuration are disclosed, for example, in U.S. Pub. No. 2013/0115452 and U.S. Pub. No. 2015/0128964, each of which is incorporated herein in its entirety.

In some embodiments of the present disclosure, the fibers may be adhered to each other to provide better processability of the final bale. While adhesion additives may be used in conjunction with any crimp configuration, it may be advantageous to use adhesion additives with a vertical crimp configuration. In some embodiments, adhering may involve adhesion additives on and/or in the fibers. Examples of such adhesion additives may include, but not be limited to, binders, adhesives, resins, tackifiers, or any combination thereof. It should be noted that any additive described herein, or otherwise, capable of adhering two fibers together may be used, which may include, but not be limited to, active particles, active compounds, ionic resins, zeolites, nanoparticles, ceramic particles, softening agents, plasticizers, pigments, dyes, flavorants, aromas, controlled release vesicles, surface modification agents, lubricating agents, emulsifiers, vitamins, peroxides, biocides, antifungals, antimicrobials, antistatic agents, flame retardants, antifoaming agents, degradation agents, conductivity modifying agents, stabilizing agents, or any combination thereof. Some embodiments of the present disclosure may involve adding adhesive additives to the fibers (in, on, or both) by incorporating the adhesive additives into the dope, incorporating the adhesive additives into the finish, applying the adhesive additives to the fibers (before, after, and/or during forming the tow band), applying the adhesive additives to the tow band (before, after, and/or during crimping), or any combination thereof.

Adhesive additives may be included in and/or on the fibers at a concentration sufficient to adhere the fibers together at a plurality of contact points to provide better processability of the final bale. The concentration of adhesive additives to use may depend on the type of adhesive additive and the strength of adhesion the adhesive additive provides. In some embodiments, the concentration of adhesive additive may range from a lower limit of 0.01%, 0.05%, 0.1%, or 0.25% to an upper limit of 5%, 2.5%, 1%, or 0.5% by weight of the tow band in the final bale. It should be noted that for additives that are used for more than adhesion, the concentration in the tow band in the final bale may be higher, e.g., 25% or less.

Further, some embodiments of the present disclosure may involve heating the fibers before, after, and/or during crimping. While said heating may be used in conjunction with any crimp configuration, it may be advantageous to use said heating with a vertical crimp configuration. Said heating may involve exposing the fibers of the tow band to steam, aerosolized compounds (e.g., plasticizers), liquids, heated fluids, direct heat sources, indirect heat sources, irradiation sources that causes additives in the fibers (e.g., nanoparticles) to produce heat, or any combination thereof.

Some embodiments of the present disclosure may include conditioning the crimped tow band. Conditioning may be used to achieve a crimped tow band having a residual acetone content of 0.5% or less w/w of the crimped tow band. Conditioning may be used to achieve a crimped tow band having a residual water content of 8% or less w/w of the crimped tow band. Conditioning may involve exposing the fibers of the crimped tow band to steam, aerosolized compounds (e.g., plasticizers), liquids, heated fluids, direct heat sources, indirect heat sources, irradiation sources that causes additives in the fibers (e.g., nanoparticles) to produce heat, or any combination thereof.

UCE is the amount of work required to uncrimp a fiber. UCE, as reported hereinafter, is sampled prior to baling, i.e., post-drying and pre-baling. UCE, as used herein, is measured as follows: using a warmed up (20 minutes before conventional calibration) Instron tensile tester (Model 1130, crosshead gears—Gear #'s R1940-1 and R940-2, Instron Series IX-Version 6 data acquisition & analysis software, Instron 50 Kg maximum capacity load cell, Instron top roller assembly, 1"×4"×⅛" thick high grade Buna-N 70 Shore A durometer rubber grip faces), a preconditioned tow sample (preconditioned for 24 hours at 22° C.±2° C. and Relative humidity at 60%±2%) of about 76 cm in length is looped over and spread evenly across the center of the top roller, pre-tensioned by gently pulling to 100 g±2 g (per readout display), and each end of the sample is clamped (at the highest available pressure, but not exceeding the manufacturers recommendations) in the lower grips to effect a 50 cm gauge length (gauge length measured from top of the robber grips), and then tested, until break, at a crosshead speed of 30 cm/minute. This test is repeated until three acceptable tests are obtained and the average of the three data points from these tests is reported. Energy (E) limits are between 0.220 kg and 10.0 kg. Displacement (D) has a preset point of 10.0 kg. UCE is calculated by the formula: UCE (gcm/cm)=(E*1000)/((D*2)+500). Breaking strength can be calculated using the same test and the following equation BS=L (where L is the load at max load (kg)). In certain embodiments of the disclosure, UCE values (in gcm/cm) can range from 190 to 400, e.g., 200 to 300, e.g., 290. In certain embodiments of the disclosure breaking strength can range from between 3.5 kg and 25 kg, e.g. 4 kg to 20 kg, 4.5 kg to 15 kg, or 5 kg to 12 kg.

The pill described herein may be added to the cellulose acetate tow once already formed and may be added during rod-making. For example, the pill may be added to the tow using a tablet inserter, such as a tablet inserter used for adding flavor ingredients in existing products.

Cigarette Filter

A degradable cigarette filter generally includes a filter element (or filter plug) made of a bloomed cellulose acetate tow, a plug wrap surrounding the filter element, and a pill dispersed in the tow. The pill may be added to the filter element during cigarette filter manufacture. The pill may be a single pill or a plurality of pills. In some aspects, the cigarette filter may be a specialty item which contains cellulose acetate in a form other than bloomed tow. The disclosure provided herein would also apply to such filters and the pill would be dispersed similarly within the cellulose acetate of such filters.

The weight, size, and amount of pills included in the tow may be determined by the desired rate of deacetylation of cellulose acetate in the tow and may also be chosen based on the filter type, e.g., microslims, superslims, and king size. Accordingly, the size of the pill may be selected based on the mass of the filter size. The ratio of pill to tow, in terms of weight, may be from 1:50 to 1:1, e.g., from 1:25 to 1:2, or from 1:10 to 1:2, Cellulose Ester Article The compositions of the present invention may be formed into fibers, films and other shaped articles of wide utility by converting process such as extrusion, thermoforming, blow molding, 3D printing, and injection molding. Exemplary articles include disposable cutlery, food serving items (plates, bowls, cups), films, sporting goods, and the like. Depending on the application, the articles of the present disclosure may also comprise one or more additives selected from the group consisting of an active particle, an antioxidant, an active compound, an ion exchange resin, a zeolite, a nanoparticle, a ceramic particle, an abrasive particulate, a filler, an absorbent particulate, a softening agent, a pigment, a dye, a flavorant, an aroma, a controlled release vesicle, a binder, an adhesive, a tackifier, a surface modification agent, a lubricating agent, an emulsifier, a vitamin, a peroxide, a biocide, an antifungal, an antimicrobial, a deodorizer, an antistatic agent, an antifoaming agent, a degradation agent, a conductivity modifying agent, and a stabilizing agent.

Active particles for use in conjunction with the present disclosure may be useful in actively reducing components from a fluid stream by absorption or reaction. Suitable active particles for use in conjunction with the present invention may include, but not be limited to, nano-scaled carbon particles, carbon nanotubes having at least one wall, carbon nanohorns, bamboo-like carbon nanostructures, fullerenes, fullerene aggregates, graphene, few layer graphene, oxidized graphene, iron oxide nanoparticles, nanoparticles, metal nanoparticles, gold nanoparticles, silver nanoparticles, metal oxide nanoparticles, alumina nanoparticles, magnetic nanoparticles, paramagnetic nanoparticles, superparamagnetic nanoparticles, gadolinium oxide nanoparticles, hematite nanoparticles, magnetite nanoparticles, gado-nanotubes, endofullerenes, $Gd@C_{60}$, core-shell nanoparticles, onionated nanoparticles, nanoshells, onionated iron oxide nanoparticles, activated carbon, ion exchange resins, desiccants, silicates, molecular sieves, silica gels, activated alumina, zeolites, perlite, sepiolite, Fuller's Earth, magnesium silicate, metal oxides, iron oxides, activated carbon, and any combination thereof.

Antioxidants for use in conjunction with the present disclosure may include a phosphite antioxidant, amine antioxidant, phenolic antioxidant, and mixtures thereof. Phosphite antioxidants may include trinonylphenyl phosphate which is sold under the commercial name Irgafos® TNPP by BASF, tris-tert-butylphenyl phosphite, tridecylphosphite, triphenylphosphite, trioctylphosphite, alkylphenylphosphite, tris(alkylphenyl)phosphate, dilaurylphosphite, bis-(2, 4-di-t-butylphenol)pentaerythritol diphosphite, which is sold under the commercial name Iragfos® 126 by BASF. Amine antioxidants may include secondary aromatic amines such as diarylamines, e.g., diphenylamine, and modified diarylamines, e.g., N-phenyl-g-naphthylamine, p-isopropoxydiphenylamine, mono and dioctyldiphenylamine, bis-diarylamines and modified bisdiarylamines, such as N,N-diphenyl-p-phenyldiamine. Phenolic antioxidants may include iodiethylene bis(3,5-di-tert-alkyl-4-hydroxyhydrocinnamates, more preferably thiodiethylene bis(3,5-di-tert-butyl-4-hydroxyhydrocinnamate which is sold under the commercial name Irganox® 1035 by BASF, and tetrakis [methylene(3,5-di-tert-alkyl hydroxyhydrocinnamate)] methanes, more preferably tetrakis[methylene(3,5-di-tert-butyl hydroxyhydrocinnamate)] methane which is sold under the commercial name Irganox® 1010 by BASF.

Suitable active particles for use in conjunction with the present disclosure may have at least one dimension of about less than one nanometer, such as graphene, to as large as a particle having a diameter of about 5000 nanometers. Active particles for use in conjunction with the present invention may range from a lower size limit in at least one dimension of about: 0.1 nanometers, 0.5 nanometers, 1 nanometer, 10 nanometers, 100 nanometers, 500 nanometers, 1 micron, 5 microns, 10 microns, 50 microns, 100 microns, 150 microns, 200 microns, and 250 microns. The active particles may range from an upper size limit in at least one dimension of about: 5000 microns, 2000 microns, 1000 microns, 900 microns, 700 microns, 500 microns, 400 microns, 300 microns, 250 microns, 200 microns, 150 microns, 100 microns, 50 microns, 10 microns, and 500 nanometers. Any combination of lower limits and upper limits above may be suitable for use in conjunction with the present invention, wherein the selected maximum size is greater than the selected minimum size. In some embodiments, the active particles for use in conjunction with the present invention may be a mixture of particle sizes ranging from the above lower and upper limits. In some embodiments of the present invention, the size of the active particles may be polymodal.

Suitable ion exchange resins for use in conjunction with the present disclosure may include, but not be limited to, polymers with a backbone, such as styrene-divinyl benzene (DVB) copolymer, acrylates, methacrylates, phenol formaldehyde condensates, and epichlorohydrin amine condensates; a plurality of electrically charged functional groups attached to the polymer backbone; or any combination thereof.

As used herein, the term "superabsorbent materials" refers to materials, e.g., polymers, capable of absorbing at least three times their weight of a fluid. Suitable superabsorbent materials for use in conjunction with the present invention may include, but not be limited to, sodium polyacrylate, starch graved copolymers of polyacrylonitriles, polyvinyl alcohol copolymers, cross-linked poly(ethylene oxides), polyacrylamide copolymers, ethylene maleic anhydride copolymers, cross-linked carboxymethylcelluloses, and the like, or any combination thereof. By way of non-limiting example, superabsorbent materials incorporated into a nonwoven may be useful in chemical spill rags and kits.

Zeolites for use in conjunction with the present disclosure may include crystalline aluminosilicates having pores, e.g., channels, or cavities of uniform, molecular-sized dimensions. Zeolites may include natural and synthetic materials. Suitable zeolites may include, but not be limited to, zeolite BETA ($Na_7(Al_7Si_{57}O_{128})$ tetragonal), zeolite ZSM-5 ($Na_n(Al_nSi_{96-n}O_{192})$ 16 $H_2O$, with n<27), zeolite A, zeolite X, zeolite Y, zeolite K-G, zeolite ZK-5, zeolite ZK-4, mesoporous silicates, SBA-15, MCM-41, MCM48 modified by 3-aminopropylsilyl groups, alumino-phosphates, mesoporous aluminosilicates, other related porous materials (e.g., such as mixed oxide gels), or any combination thereof.

Suitable nanoparticles for use in conjunction with the present disclosure may include, but not be limited to, nano-scaled carbon particles like carbon nanotubes of any number of walls, carbon nanohorns, bamboo-like carbon nanostructures, fullerenes and fullerene aggregates, and graphene including few layer graphene and oxidized graphene; metal nanoparticles like gold and silver; metal oxide nanoparticles like alumina, silica, and titania; magnetic, paramagnetic, and superparamagentic nanoparticles like gadolinium oxide, various crystal structures of iron oxide like hematite and magnetite, about 12 nm $Fe_3O_4$, gado-nanotubes, and endofullerenes like $Gd@C_{60}$; and core-shell and onionated nanoparticles like gold and silver nanoshells, onionated iron oxide, and others nanoparticles or microparticles with an outer shell of any of said materials; and any combination of the foregoing. It should be noted that nanoparticles may include nanorods, nanospheres, nanorices, nanowires, nanostars (like nanotripods and nanotetrapods), hollow nanostructures, hybrid nanostructures that are two or more nanoparticles connected as one, and non-nano particles with nano-coatings or nano-thick walls. It should be further noted that nanoparticles for use in conjunction with the present invention may include the functionalized derivatives of nanoparticles including, but not limited to, nanoparticles that have been functionalized covalently and/or non-covalently, e.g., pi-stacking, physisorption, ionic association, van der Waals association, and the like. Suitable functional groups may include, but not be limited to, moieties comprising amines (1°, 2°, or 3°), amides, carboxylic acids, aldehydes, ketones, ethers, esters, peroxides, silyls, organosilanes, hydrocarbons, aromatic hydrocarbons, and any combination thereof; polymers; chelating agents like ethylenediamine tetraacetate, diethylenetriaminepentaacetic acid, triglycollamic acid, and a structure comprising a pyrrole ring; and any combination thereof.

Suitable ceramic particles for use in conjunction with the present invention may include, but not be limited to, oxides (e.g., silica, titania, alumina, beryllia, ceria, and zirconia), nonoxides (e.g., carbides, borides, nitrides, and silicides), composites thereof, or any combination thereof. Ceramic particles may be crystalline, non-crystalline, or semi-crystalline.

Suitable softening agents for use in conjunction with the present invention may include, but not be limited to, water, glycerol triacetate (triacetin), triethyl citrate, dimethoxyethyl phthalate, dimethyl phthalate, diethyl phthalate, methyl phthalyl ethyl glycolate, o-phenyl phenyl-(bis) phenyl phosphate, 1,4-butanediol diacetate, diacetate, dipropionate ester of triethylene glycol, dibutyrate ester of triethylene glycol, dimethoxyethyl phthalate, triethyl citrate, triacetyl glycerin, and the like, any derivative thereof, and any combination thereof.

As used herein, pigments refer to compounds and/or particles that impart color and are incorporated throughout the filaments. Suitable pigments for use in conjunction with the present invention may include, but not be limited to, titanium dioxide, silicon dioxide, carbon black, tartrazine, E102, phthalocyanine blue, phthalocyanine green, quinacridones, perylene tetracarboxylic acid di-imides, dioxazines, perinones disazo pigments, anthraquinone pigments, carbon black, metal powders, iron oxide, ultramarine, calcium carbonate, kaolin clay, aluminum hydroxide, barium sulfate, zinc oxide, aluminum oxide, caramel, fruit or vegetable or spice colorants (e.g., beet powder, beta-carotene, turmeric, paprika), or any combination thereof. In some aspects, the cellulose acetate tow, the cigarette filter, and the cellulose ester article are substantially free of, or free of, titanium dioxide, specifically of titanium dioxide that acts as the principal agent for degradation.

As used herein, dyes refer to compounds and/or particles that impart color and are a surface treatment of the filaments. Suitable dyes for use in conjunction with the present invention may include, but not be limited to, CARTASOL® dyes (cationic dyes, available from Clariant Services) in liquid and/or granular form (e.g., CARTASOL® Brilliant Yellow K-6G liquid, CARTASOL® Yellow K-4GL liquid, CARTASOL® Yellow K-GL liquid, CARTASOL® Orange K-3GL liquid, CARTASOL® Scarlet K-2GL liquid, CARTASOL® Red K-3BN liquid, CARTASOL® Blue K-5R liquid, CARTASOL® Blue K-RL liquid, CARTASOL® Turquoise K-RL liquid/granules, CARTASOL® Brown K-BL liquid), FASTUSOL® dyes (an auxochrome, available from BASF) (e.g., Yellow 3GL, Fastusol C Blue 74L).

Suitable flavorants for use in conjunction with the present invention may include, but not be limited to, organic material (or naturally flavored particles), carriers for natural flavors, carriers for artificial flavors, and any combination thereof. Organic materials (or naturally flavored particles) include, but are not limited to, tobacco, cloves (e.g., ground cloves and clove flowers), cocoa, and the like. Natural and artificial flavors may include, but are not limited to, menthol, cloves, cherry, chocolate, orange, mint, mango, vanilla, cinnamon, tobacco, and the like. Such flavors may be provided by menthol, anethole (licorice), anisole, limonene (citrus), eugenol (clove), and the like, or any combination thereof. In some embodiments, more than one flavorant may be used including any combination of the flavorants provided herein.

Suitable aromas for use in conjunction with the present disclosure may include, but not be limited to, methyl formate, methyl acetate, methyl butyrate, ethyl acetate, ethyl butyrate, isoamyl acetate, pentyl butyrate, pentyl pentanoate, octyl acetate, myrcene, geraniol, nerol, citral, citronellal, citronellol, linalool, nerolidol, limonene, camphor, terpineol, alpha-ionone, thujone, benzaldehyde, eugenol, cinnamaldehyde, ethyl maltol, vanilla, anisole, anethole, estragole, thymol, furaneol, methanol, or any combination thereof.

Suitable binders for use in conjunction with the present disclosure may include, but not be limited to, polyolefins, polyesters, polyamides (or nylons), polyacrylics, polystyrenes, polyvinyls, polytetrafluoroethylene (PTFE), polyether ether ketone (PEEK), any copolymer thereof, any derivative thereof, and any combination thereof. Non-fibrous plasticized cellulose derivatives may also be suitable for use as binder particles in the present invention. Examples of suitable polyolefins may include, but not be limited to, polyethylene, polypropylene, polybutylene, polymethylpentene, and the like, any copolymer thereof, any derivative thereof, and any combination thereof. Examples of suitable polyethylenes may include, but not be limited to, ultrahigh molecular weight polyethylene, very high molecular weight polyethylene, high molecular weight polyethylene, low-density polyethylene, linear low-density polyethylene, high-density polyethylene, and the like, any copolymer thereof, any derivative thereof, and any combination thereof. Examples of suitable polyesters may include, but not be limited to, polyethylene terephthalate, polybutylene terephthalate, polycyclohexylene dimethylene terephthalate, polytrimethylene terephthalate, and the like, any copolymer thereof, any derivative thereof, and any combination thereof. Examples of suitable polyacrylics may include, but not be limited to, polymethyl methacrylate, and the like, any copolymer thereof, any derivative thereof, and any combination thereof. Examples of suitable polystyrenes may include, but not be limited to, polystyrene, acrylonitrile-butadiene-styrene, styrene-acrylonitrile, styrene-butadiene, styrene-maleic anhydride, and the like, any copolymer thereof, any derivative thereof, and any combination thereof. Examples of suitable polyvinyls may include, but not be limited to, ethylene vinyl acetate, ethylene vinyl alcohol, polyvinyl chloride, and the like, any copolymer thereof, any derivative thereof, and any combination thereof. Examples of suitable cellulosics may include, but not be limited to, cellulose acetate, cellulose acetate butyrate, plasticized cellulosics, cellulose propionate, ethyl cellulose, and the like, any copolymer thereof, any derivative thereof, and any combination thereof. In some embodiments, binder particles may comprise any copolymer, any derivative, or any combination of the above listed binders. Further, binder particles may be impregnated with and/or coated with any combination of additives disclosed herein.

Suitable tackifiers for use in conjunction with the present disclosure may include, but not be limited to, methylcellulose, ethylcellulose, hydroxyethylcellulose, carboxy methylcellulose, carboxy ethylcellulose, water-soluble cellulose acetate, amides, diamines, polyesters, polycarbonates, silyl-modified polyamide compounds, polycarbamates, urethanes, natural resins, shellacs, acrylic acid polymers, 2-ethylhexylacrylate, acrylic acid ester polymers, acrylic acid derivative polymers, acrylic acid homopolymers, anacrylic acid ester homopolymers, poly(methyl acrylate), poly(butyl acrylate), poly(2-ethylhexyl acrylate), acrylic acid ester co-polymers, methacrylic acid derivative polymers, methacrylic acid homopolymers, methacrylic acid ester homopolymers, poly(methyl methacrylate), poly(butyl methacrylate), poly(2-ethylhexyl methacrylate), acrylamido-methyl-propane sulfonate polymers, acrylamido-methyl-propane sulfonate derivative polymers, acrylamido-methyl-propane sulfonate co-polymers, acrylic acid/acrylamido-methyl-propane sulfonate co-polymers, benzyl coco di-(hydroxyethyl) quaternary amines, p-T-amyl-phenols condensed with formaldehyde, dialkyl amino alkyl (meth)acrylates, acrylamides, N-(dialkyl amino alkyl) acrylamide, methacrylamides, hydroxy alkyl (meth)acrylates, methacrylic acids, acrylic acids, hydroxyethyl acrylates, and the like, any derivative thereof, or any combination thereof.

Suitable lubricating agents for use in conjunction with the present disclosure may include, but not be limited to, ethoxylated fatty acids (e.g., the reaction product of ethylene oxide with pelargonic acid to form poly(ethylene glycol) ("PEG") monopelargonate; the reaction product of ethylene oxide with coconut fatty acids to form PEG monolaurate), and the like, or any combination thereof. The lubricant agents may also be selected from nonwater-soluble materials such as synthetic hydrocarbon oils, alkyl esters (e.g., tridecyl stearate which is the reaction product of tridecyl alcohol and stearic acid), polyol esters (e.g., trimethylol propane tripelargonate and pentaerythritol tetrapelargonate), and the like, or any combination thereof.

Suitable emulsifiers for use in conjunction with the present disclosure may include, but not be limited to, sorbitan monolaurate, e.g., SPAN® 20 (available from Uniqema, Wilmington, Del.), or poly(ethylene oxide) sorbitan monolaurate, e.g., TWEEN® 20 (available from Uniqema, Wilmington, Del.).

Suitable vitamins for use in conjunction with the present disclosure may include, but not be limited to, vitamin B compounds (including B1 compounds, B2 compounds, B3 compounds such as niacinamide, niacinnicotinic acid, tocopheryl nicotinate, $C_1$-$C_{18}$ nicotinic acid esters, and nicotinyl alcohol; B5 compounds, such as panthenol or "pro-B5", pantothenic acid, pantothenyl; B6 compounds, such as pyroxidine, pyridoxal, pyridoxamine; carnitine, thiamine, riboflavin); vitamin A compounds, and all natural and/or synthetic analogs of Vitamin A, including retinoids, retinol, retinyl acetate, retinyl palmitate, retinoic acid, retinaldehyde, retinyl propionate, carotenoids (pro-vitamin A), and other compounds which possess the biological activity of Vitamin A; vitamin D compounds; vitamin K compounds; vitamin E compounds, or tocopherol, including tocopherol sorbate, tocopherol acetate, other esters of tocopherol and tocopheryl compounds; vitamin C compounds, including ascorbate, ascorbyl esters of fatty acids, and ascorbic acid derivatives, for example, ascorbyl phosphates such as magnesium ascorbyl phosphate and sodium ascorbyl phosphate, ascorbyl glucoside, and ascorbyl sorbate; and vitamin F compounds, such as saturated and/or unsaturated fatty acids; or any combination thereof.

Suitable antimicrobials for use in conjunction with the present disclosure may include, but not be limited to, anti-microbial metal ions, chlorhexidine, chlorhexidine salt, triclosan, polymoxin, tetracycline, amino glycoside (e.g., gentamicin), rifampicin, bacitracin, erythromycin, neomycin, chloramphenicol, miconazole, quinolone, penicillin, nonoxynol 9, fusidic acid, cephalosporin, mupirocin, metronidazolea secropin, protegrin, bacteriolcin, defensin, nitrofurazone, mafenide, acyclovir, vanocmycin, clindamycin, lincomycin, sulfonamide, norfloxacin, pefloxacin, nalidizic acid, oxalic acid, enoxacin acid, ciprofloxacin, polyhexamethylene biguanide (PHMB), PHMB derivatives (e.g., biodegradable biguanides like polyethylene hexamethylene biguanide (PEHMB)), clilorhexidine gluconate, chlorohexidine hydrochloride, ethylenediaminetetraacetic acid (EDTA), EDTA derivatives (e.g., disodium EDTA or tetrasodium EDTA), and the like, and any combination thereof.

Antistatic agents (antistats) for use in conjunction with the present disclosure may comprise any suitable anionic, cationic, amphoteric or nonionic antistatic agent. Anionic antistatic agents may generally include, but not be limited to, alkali sulfates, alkali phosphates, phosphate esters of alcohols, phosphate esters of ethoxylated alcohols, or any combination thereof. Examples may include, but not be limited to, alkali neutralized phosphate ester (e.g., TRYFAC® 5559 or TRYFRAC® 5576, available from Henkel Corporation, Mauldin, S. C.). Cationic antistatic agents may generally include, but not be limited to, quaternary ammonium salts and imidazolines which possess a positive charge. Examples of nonionics include the poly(oxyalkylene) derivatives, e.g., ethoxylated fatty acids like EMEREST® 2650 (an ethoxylated fatty acid, available from Henkel Corporation, Mauldin, S. C.), ethoxylated fatty alcohols like TRYCOL® 5964 (an ethoxylated lauryl alcohol, available from Henkel Corporation, Mauldin, S. C.), ethoxylated fatty amines like TRYMEEN® 6606 (an ethoxylated tallow amine, available from Henkel Corporation, Mauldin, S. C.), alkanolamides like EMID® 6545 (an oleic diethanolamine, available from Henkel Corporation, Mauldin, S. C.), or any combination thereof. Anionic and cationic materials tend to be more effective antistats.

Pill

In order to aid the degradation of cellulose acetate, particularly cellulose acetate tow, a pill containing a basic material, an enzymatic material, or combinations thereof is dispersed within the tow or the cellulose ester article. There are several advantages to dispersing such a pill in the tow or article as opposed to other methods of including a degradation aid in the tow or article. For example, if a basic material or enzymatic material was simply added to the tow during tow manufacturing and was dispersed in the tow as particles within the fibers, there would be limited availability of the material and thus the material would not aid in cellulose acetate tow degradation. Such a method may also be diffusion limited. For some specific basic materials, such as calcium oxide or calcium hydroxide, including the material as particles in the tow would lead to degradation of the tow soon after the tow was manufactured because ambient moisture would activate the degradation. Instead, by including a pill, ambient moisture does not prematurely activate degradation. The pill is also configured to allow for availability of the material when exposed to water in an amount more than ambient levels, and the degradation would not be diffusion limited.

An additional advantage to the inclusion of a basic material or an enzymatic material as compared to an acidic material is the time needed to hydrolyze the acetate moieties. While acids can hydrolyze the acetate moieties, they are slower than basic or enzymatic materials. This relatively slower hydrolysis may be problematic when the cigarette filters are discarded in the environment. For example, if the filter is discarded in a puddle of water, or if a heavy rain storms hits, the acidic material may be washed out of the cellulose acetate tow and thus no acidic material would remain to catalyze degradation of the cellulose acetate. In contrast, the basic materials hydrolyze the cellulose acetate quickly when submersed in water, allowing for deacetylation before the basic material is washed out of the tow. The same would be true for cellulose ester articles, such as films or even disposable cutlery. The availability of the degradation aid is key.

By including a basic or enzymatic material, particularly a material that is able to deacetylate the cellulose acetate tow or cellulose ester in the article, when exposed to water, by at least 10% in 20 days or less, the chances of the basic or enzymatic material washing out before they catalyst degradation are greatly reduced. As used herein, "when exposed to water" refers to the complete submersion of the tow containing the pill in water at room temperature, e.g., from 22 to 25° C. and standard pressure.

Additionally, by including a basic or enzymatic material as compared to an acidic material, the degraded cellulose acetate tow, cellulose ester article, and any waste therefrom is closer to neutral than an acidic material. Without being bound by theory, it is believed that this occurs because unlike an acid catalyst, which protonates the carbonyl groups, the basic material is actually consumed. In some aspects, the basic material has an initial pH of greater than 7.4 and the cellulose acetate tow, after being deacetylated by the basic material, has a pH of less than 7.4, e.g., a pH of less than 7.3, less than 7.2, or less than 7.1. In terms of lower limits, the cellulose acetate tow, after being deacetylated by the basic material, has a pH of at least 6, e.g., at least 6.2, at least 6.4, at least 6.6, or at least 6.8. In some aspects, the basic material has an initial pH of greater than 7.6 and the tow, after being deacetylated by the basic material, as a pH of less than 7.4. In some further aspects, the pH decreases by at least 2 pH units. In some aspects, the pH of the cellulose acetate tow after being deacetylated, is approximately 7.

As used herein, the term "pill" refers to a tablet or a capsule, including soft capsules, hard capsules, gelatin capsules, liquid capsules, controlled released capsules, controlled release tablets, caplets. The pill may range in size from 1 to 10 mm, based on the dimension of the pill's largest diameter, e.g., from 1 to 9 mm, from 1 to 8 mm, from 1 to 7 mm, from 1 to 5 mm, from 3 to 10 mm, or from 4 to 10 mm. The pill may be formed in any known shape. As used herein, the term "pill" is more than particles of the basic and/or enzymatic material dispersed in the tow.

In some aspects, when the pill is a liquid capsule, the liquid capsule is crushable. The liquid capsule may have a crush strength that allows for the user to crush the liquid capsule with his or her fingers. Such capsules have been described, for example, in U.S. Pat. No. 10,015,984, the entire contents and disclosure of which is incorporated by reference. The liquid capsule may comprise the catalyst and may optionally contain an additional hydrolyzing agent. The liquid capsule may be spherical in shape to allow for insertion by a standard tablet inserter, though the shape is not limited to spherical.

The basic material may comprise at least one of calcium carbonate, calcium oxide, calcium hydroxide, magnesium hydroxide, magnesium oxide, sodium phosphate, or combinations thereof. The basic material may have a pH of at least greater than 7.0, e.g., at least 7.4, at least 7.5, at least 7.6, at least 7.7, at least 7.8, at least 7.9, or at least 8.0. In some aspects, the basic material may be a strong base such as calcium oxide, calcium hydroxide, or combinations thereof. Without being bound by theory, it is believed that when the pill comprises a strong base, the pill is dual action because it may hydrolyze the acetate moieties and cleave glycosidic bonds within the cellulose acetate tow.

The enzymatic material may comprise an esterase, a cellulase, a glucosidase, or combinations thereof. In some aspects, the esterase is a lipase. When the enzymatic material is included without any basic materials, an esterase is used. When the enzymatic material is included in addition to a basic material, then a cellulase, glucosidase, or combinations of cellulase, glucosidase, and esterase may be used.

The basic and/or enzymatic material may be included in the pill in various ways. For example, the basic and/or enzymatic material may make up the entire pill, may be included in the pill with other materials, and/or may be included in a coating on the pill. In some aspects, the pill may comprise a coating containing the basic and/or enzymatic material. The basic and/or enzymatic material may be present only in the coating or may be present in both the coating and in the interior of the pill. The basic and/or enzymatic material may also be present in concentrated portions of the pill or may be dispersed throughout the pill. When the coating contains the basic material, enzymatic material, or combinations thereof, the basic material, enzymatic material, or combinations thereof may be dispersed in a portion of the coating between the surface of the coating and the interior of the pill, i.e., the basic material, enzymatic material, or combinations is not facing the environment. In other aspects, the basic material, enzymatic material, or combinations thereof may be throughout the coating, but then an additional coating is provided around the coated pill so that the basic material, enzymatic material, or combinations thereof is not exposed to the environment, which may prematurely activate decomposition.

In order to control the activation of the basic and/or enzymatic material in the pill, the pill may comprise an outermost coating, e.g., a coating based on a material other than cellulose acetate. The coating may be water soluble, e.g., may have a water solubility of at least 0.01 g/100 mL at 25° C., e.g., at least 0.1 g/100 mL at 25° C., at least 0.5 g/100 mL at 25° C., at least 1.0 g/100 mL at 25° C. In some aspects, the coating material comprises gelatin, polyethylene glycol, polylactic acid, polycaprolactone, polyvinyl pyrrolidone, polyvinyl alcohol or combinations thereof. In further aspects, the coating may comprise an oligosaccharide, a monosaccharide, a polyhydroxyalkanoate, or combinations thereof. The coating material may comprise less than 1 wt. % cellulose acetate, less than 0.1 wt. % cellulose acetate, or may be free of cellulose acetate. The coating may have a thickness from 0.1 to 100 µm, e.g., from 0.5 to 80 µm, from 1 to 75 µm, or from 5 to 50 µm. The thickness may be uniform around the pill, or may have varied thicknesses. In some aspects, the water solubility of the basic material may be less than the water solubility of the coating, e.g., at least 5% less, at least 10% less, or at least 25% less. In some aspects, an outermost coating may be free of cellulose acetate while an inner coating does contain cellulose acetate.

The pill, including any coating thereon, may comprise from 1 to 99 wt. % basic material, e.g., from 5 to 99 wt. %, from 10 to 90 wt. %, or from 25 to 75 wt. %. The pill may also contain other components, including fillers, flavorings, sweeteners, emulsifiers, disintegration aids, humectants, buggering agents, and mixtures thereof. These other components may make up the remainder of the weight of the pill, either alone or in combination with the basic material and/or enzymatic material described herein. In some aspects, the other components of the formulations may be artificial or may be obtained or derived from herbal or biological sources. Exemplary types of components that can be incorporated into one or more formulations according to the invention include salts such as sodium chloride, potassium chloride, sodium citrate, potassium citrate, sodium acetate, potassium acetate; natural sweeteners such as fructose, sucrose, glucose, maltose, vanillin, ethyl vanillin glycoside, mannose, galactose, and lactose; artificial sweeteners such as sucralose, saccharin, aspartame, acesulfame K, and neotame; organic and inorganic fillers such as grains, processed grains, swollen grains, maltodextrin, dextrose, calcium carbonate, calcium phosphate, corn starch, lactose, sugar alcohols such as isomalt, mannitol, xylitol, or sorbitol, cellulose finely divided, and vegetable protein; binders such as povidone, sodium carboxymethyl cellulose and other modified cellulosic types of binders, sodium alginate, xanthan gum, starch-based binders, gum arabic, gellan gum, and lecithin; gelling agents such as fish jelly pH adjusting agents or buffering agents such as metal hydroxides, including metal hydroxides alkalines such as sodium hydroxide and potassium hydroxide, and other alkali metal buffers such as metal carbonates, including potassium carbonate or sodium carbonate, or metal bicarbonates such as sodium bicarbonate; emulsifiers; dyes and pigments; humectants such as glycerin and propylene glycol; preservatives such as potassium sorbate; syrups such as honey and high fructose corn syrup; disintegration aids such as microcrystalline cellulose, croscarmellose sodium, crospovidone, sodium starch glycolate, and pregelatinized corn starch; flavoring and mixtures of flavorings, antioxidants, and mixtures thereof. Exemplary types of components may include those described in, for example, US Pub. No. 2010/0291245 which is incorporated herein by reference.

In some aspects, the basic material may be included in the coating of the pill. For example, the coating may comprise at least 1 wt. % basic material, based on the total weight of the coating, e.g., at least 5 wt. %, at least 10 wt. %, at least 20 wt. %, at least 30 wt. %, at least 40 wt. %, or at least 50 wt. %. The ratio of coating material to the basic material, on a weight basis, may range from 10:1 to 1:99, e.g., from 5:1 to 1:99, from 3:1 to 1:99, from 1:1 to 1:99, or from 1:1 to 1:50. The basic material may be included in the pill itself. In some aspects, both the pill and the coating include the basic material. In other aspects, either the pill or the coating contain the basic material.

When contained in the pill itself, meaning other than in the coating, the pill may comprise at least 1 wt. % basic material, based on the total weight of the coating, e.g., at least 5 wt. %, at least 10 wt. %, at least 20 wt. %, at least 30 wt. %, at least 40 wt. %, or at least 50 wt. %.

In some aspects, the enzymatic material may be included in the coating of the pill. For example, the coating may comprise at least 1 wt. % enzymatic material, based on the total weight of the coating, e.g., at least 5 wt. %, at least 10 wt. %, at least 20 wt. %, at least 30 wt. %, at least 40 wt. %, or at least 50 wt. %. The ratio of coating material to the enzymatic material, on a weight basis, may range from 10:1 to 1:99, e.g., from 5:1 to 1:99, from 3:1 to 1:99, from 1:1 to 1:99, or from 1:1 to 1:50.

When contained in the pill itself, meaning other than in the coating, the pill may comprise at least 1 wt. % enzymatic material, based on the total weight of the coating, e.g., at least 5 wt. %, at least 10 wt. %, at least 20 wt. %, at least 30 wt. %, at least 40 wt. %, or at least 50 wt. %.

The enzymatic material may be included in the pill itself. In some aspects, both the pill and the coating include the enzymatic material. In other aspects, either the pill or the coating contain the enzymatic material. In aspects where the pill does not contain a basic material, the enzymatic material comprises an esterase in order to deacetylate the cellulose acetate. In aspects where the pill comprises a basic material, the pill may comprise an esterase, a cellulase, a glucosidase, or combinations thereof. The esterase may be included to deacetylate, or aid in the deacetylation of the cellulose acetate, while the cellulase, glucosidase, or combinations thereof may be included to degrade the cellulose acetate once the DS of the cellulose acetate is less than 1.3.

In further aspects, the pill may contain the basic material or esterase in a coating on the pill and may then contain a different enzymatic material in the pill. This different enzymatic material, such as a cellulase, glucosidase, or combinations thereof, may be coated and contained in the pill. The coating for the enzymatic material may be the same or different from the coating of the pill, and is referred to herein as a second coating.

In some aspects, the pill deacetylates the cellulose acetate tow by at least 20% in 20 days or less, at least 30% in 20 days or less, at least 40% in 20 days or less, at least 50% in 20 days or less, or at least 60% in 20 days or less. In some aspects, the pill deacetylates the cellulose acetate tow by at least 20% in 10 days or less, at least 30% in 10 days or less, at least 40% in 10 days or less, at least 50% in 10 days or less, at least 60% in 10 days or less, at least 80% in 10 days or less, or at last 90% in 10 days or less. In some aspects, the pill deacetylates the cellulose acetate tow by at least 20% in 30 days or less, at least 40% in 30 days or less, at least 50% in 30 days or less, at least 60% in 30 days or less, at least 70% in 30 days or less, or at least 80% in 30 days or less. As used herein, deacetylation is measured by using ion chromatography with a conductivity detector measuring the acetate anion directly in an aqueous solution.

Coating or Portion Formed for Cellulose Ester Article

As described herein, the basic materials, enzymatic materials, or combination thereof may be included in the cellulose ester article as a coating or by forming a portion of the article from the basic materials, enzymatic materials, or combination thereof. The coating may cover a portion of the cellulose ester article or the entire article, e.g., at least 0.1% of the article, in terms of surface area covered, e.g., at least 0.5%, at least 1%, at least 2%, at least 3%, at least 4%, or at least 5%. The coating may have a thickness from 0.1 μm to 1 mm, e.g., from 0.2 μm to 1 mm, from 0.3 μm to 1 mm, from 0.4 μm to 1 mm, from 0.5 μm to 1 mm, or any ranges in between. The coating may contain the materials described in the pill section above, including a first coating comprising a basic material with a second coating comprising an enzymatic material, wherein the second coating is oriented between the basic material coating and the cellulose ester article.

Alternatively, or in addition to the coating, a portion of the cellulose ester article may actually be formed from the basic material, enzymatic material, or combinations thereof. Like the coating and the pill, the size, weight, and makeup of this portion may be selected depending on a number of factors. In some aspects, more than one portion of the cellulose ester article may be formed from the basic material, enzymatic material, or combinations thereof. The portions may be randomly spaced or may be evenly spaced.

The present disclosure will be better understood in view of the following non-limiting examples.

EXAMPLES

Example 1

In order to determine the deacetylation rate of cellulose acetate depending on various catalytic materials, cellulose acetate tow having a DS of 2.5, was prepared and formed into rods. The rods also contained 8 wt. % triacetin as plasticizer. The weight of each rod was approximately 0.15 grams. Each rod was then placed into approximately 4 milliliters of deionized water. In all samples except Comparative Sample A, shown below, approximately 50 milligrams of the catalytic material was added to the water. After three days and after 38 days, the pH was measured. The percentage of deacetylation was measured by removing a sample of the cellulose acetate tow and using high performance liquid chromatography (HPLC). The results are shown below.

TABLE 1

|  | Catalytic Material | pH Day 1 | pH Day 38 |
|---|---|---|---|
| Comp. Sample A | — | 6.5 | 6.0 |
| Comp. Sample B | Citric Acid | 2.0 | 2.0 |
| Sample 1 | Magnesium Oxide | 9.0 | 6.5 |
| Sample 2 | Magnesium Hydroxide | 8.0 | 7.0 |
|  |  | pH Day 1 | pH Day 35 |
| Sample 3 | Calcium Oxide | 11.0 | 9.0 |
| Sample 4 | Calcium Hydroxide | 11.0 | 7.0 |
|  |  | pH Day 1 | pH Day 21 |
| Comp. Sample C | Sodium Phosphate | 10.0 | 8.0 |

TABLE 2

| Percent of Deacetylation (%) | | | | | | | |
|---|---|---|---|---|---|---|---|
| | Day 4 | Day 6 | Day 10 | Day 12 | Day 14 | Day 19 | Day 31 | Day 38 |
| Comp. Sample A | 7.80 | 8.09 | 8.27 | 8.36 | 8.28 | 8.84 | 8.85 | 9.93 |
| Comp. Sample B | 1.52 | 1.67 | 2.28 | 2.63 | 2.96 | 3.83 | 5.36 | 5.88 |
| Sample 1 | 11.62 | 14.41 | 17.59 | 19.48 | 21.54 | 27.04 | 47.26 | 43.02 |
| Sample 2 | 10.18 | 10.93 | 12.60 | 12.34 | 13.46 | 14.65 | 18.85 | 20.01 |
| | Day 1 | Day 3 | Day 7 | Day 9 | Day 11 | Day 16 | Day 28 | Day 35 |
| Sample 3 | 83.87 | >100 | >100 | >100 | >100 | >100 | >100 | >100 |
| Sample 4 | 67.79 | 94.58 | >100 | >100 | >100 | 73.19 | 81.34 | >100 |
| | Day 1 | Day 3 | Day 7 | Day 14 | Day 21 | | | |
| Comp. Sample C | 25.05 | 26.70 | 29.04 | 27.21 | 28.81 | | | |

The rate of deacetylation is important because, as described herein, the acetyl moieties of cellulose acetate must be replaced with hydroxyl moieties in order for natural degradation to occur. As shown above, Comparative Sample A, which did not include catalytic material, only had a 9.93% deacetylation after 38 days. Comparative Sample B, which included citric acid as the catalytic material, surprisingly performed worse than Comparative Sample A. Samples 1 and 2 performed well and showed more deacetylation at Day 4 than Comparative Samples A and B at Day 38. Samples 3 and 4 had the best performance, reaching full or nearly full deacetylation by Day 3. Although the deacetylation for Samples 3 and 4 includes values above 100%, it is believed that these values were due to the assumption of 8 wt. % triacetin.

Example 2

In order to determine the deacetylation rate of cellulose acetate in a cigarette filter that has been smoked, depending on various materials, cellulose acetate tow rods were prepared as above, except that they had a filter rod weight of approximately 0.24 grams. The plasticizer and catalyst were the same as in Example 1. The basic material was also as in Example 1. The measurements were taken as in Example 1. The results are shown below.

TABLE 3

|  | Catalytic Material | pH Day 1 | pH Day 21 |
| --- | --- | --- | --- |
| Comp. Sample D | — | 7.5 | 6.5 |
| Comp. Sample E | Citric Acid | 4.0 | 4.0 (Day 15) |
| Sample 5 | Calcium Oxide | 11.0 | 8.0 |
| Sample 6 | Calcium Hydroxide | 11.0 | 7.0 |
| Sample 7 | Magnesium Oxide | 9.0 | 7.5 |
| Comp. Sample F | Calcium Carbonate | 7.5 | 6.5 |

TABLE 4

| | Percent of Deacetylation (%) | | | | |
| --- | --- | --- | --- | --- | --- |
| | Day 1 | Day 3 | Day 7 | Day 14 | Day 21 |
| Comp. Sample D | 6.21 | 7.23 | 7.66 | 9.18 | 9.31 |
| Comp. Sample E | 4.3 | 4.38 | 4.39 (Day 6) | 4.58 (Day 8) | 5.90 (Day 15) |
| Sample 5 | 33.24 | 77.63 | 88.44 | 88.42 | 92.30 |
| Sample 6 | 30.09 | 42.20 | 43.55 | 46.72 | 50.80 |
| Sample 7 | 7.42 | 13.66 | 14.86 | 26.36 | 31.36 |
| Comp. Sample F | 8.15 | 9.37 | 10.21 | 9.04 | 7.36 |

Similarly to the results shown above, inclusion of a pill with a basic material resulted in the surprising and unexpected improved rate of deacetylation as compared to Comparative Samples D, E and F.

Example 3

Samples were prepared as above, except that the basic material was embedded within a cigarette filter.

TABLE 5

| | | Percent of Deacetylation (%) | | | |
| --- | --- | --- | --- | --- | --- |
| | Material | Day 1 | Day 4 | Day 7 | Day 9 |
| Comp. Sample G | no material added, unsmoked | 7.53 | 8.26 | 7.53 | 7.88 |
| Sample 8 | Magnesium Oxide unsmoked | 11.9 | 14.82 | 17.5 | 19.04 |
| Sample 9 | Calcium Hydroxide unsmoked | 88.32 | >100 | >100 | >100 |
| Sample 10 | Calcium Oxide unsmoked | >100 | >100 | >100 | >100 |
| Comp. Sample H | no material added, smoked | 6.73 | 8.07 | 8.00 (Day 6) | |
| Sample 11 | Magnesium Oxide smoked | 10.30 | 9.74 | 15.79 (Day 6) | |
| Sample 12 | Calcium Hydroxide smoked | 26.61 | 49.04 | 59.94 (Day 6) | |
| Sample 13 | Calcium Oxide smoked | 32.11 | 59.71 | 73.08 (Day 6) | |

Example 4

To test the total degradation, smoked cigarettes were provided, with the paper removed. The basic material was placed inside of the filter and then subjected to biodegradation. ISO 19679 (2016) was followed, except that river water was substituted for ocean water. The results are shown in FIG. 1, and show that calcium oxide and calcium hydroxide consumed nearly twice the carbon dioxide as when no basic material was included. The percentage of carbon dioxide consumed relative to cellulose, based on the slope of the line, was 82.39% for calcium hydroxide, 83.10% for calcium oxide, and 42.55% for the control without any basic material added.

Example 5

Figure 2:
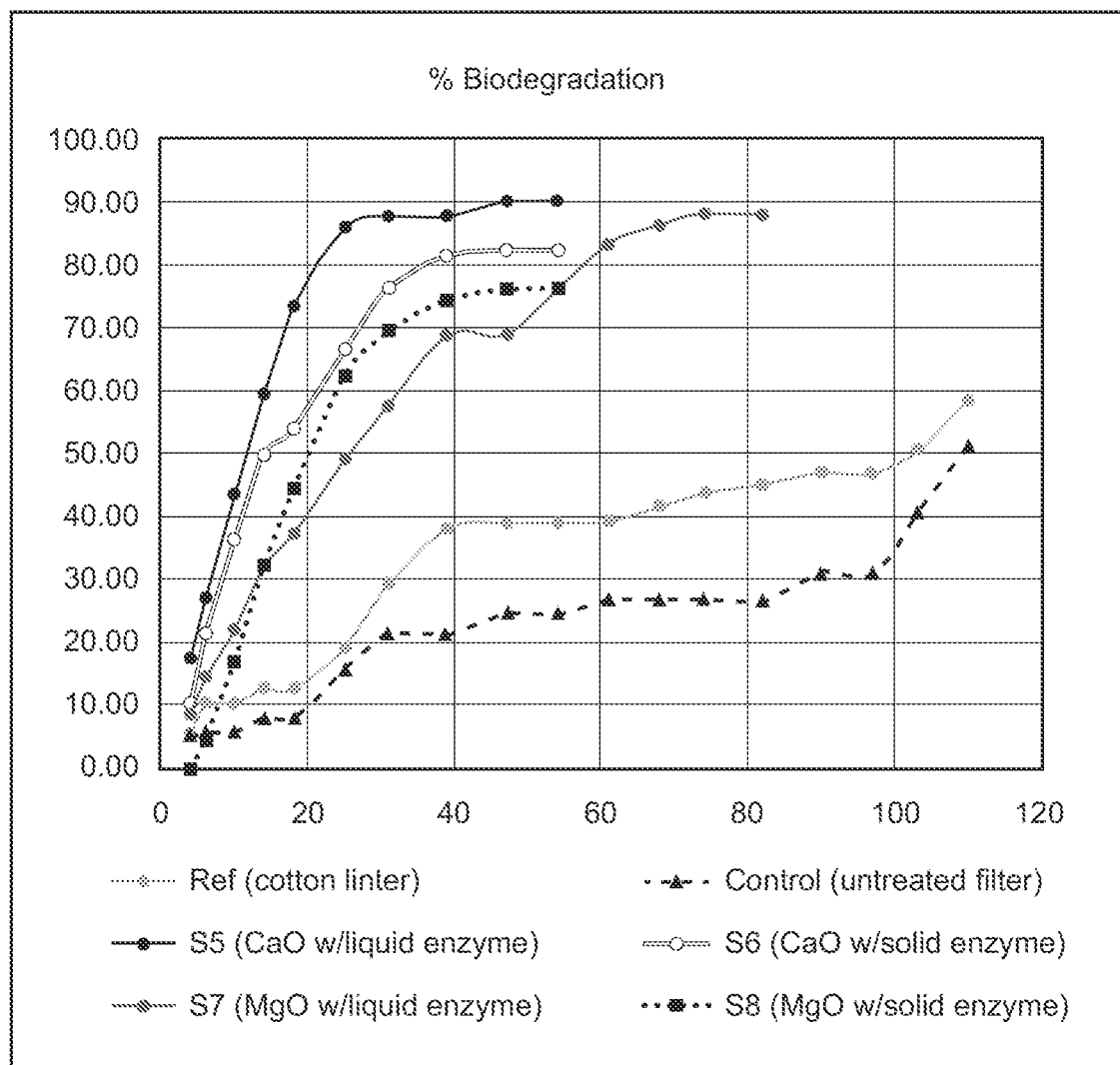
FIG. 2 shows additional test results for total degradation in accordance with the present disclosure.

To test the total degradation, smoked cigarettes were provided, with the paper removed. The enzymatic material was placed inside of the filter and then subjected to biodegradation. ISO 19679 (2016) was followed, except that river water with 30 g river sediment per 70 g river water with approximately 30 mg of sample in a 250 mL Erlenmeyer flask was substituted for ocean water. The evolved carbon dioxide was absorbed by 3 mL of 0.5N KOH solution and determined by titration with 0.05 M of HCL solution. The percentage biodegradation was obtained by the ratio of evolved carbon dioxide to theoretical carbon dioxide. The results are shown in FIG. 2, and show that the % biodegradation for Samples S5-S8 was greater over a shorter period of time (in days) as compared to the reference (cotton linter) and the control (untreated filter).

Example 6

Figure 3:
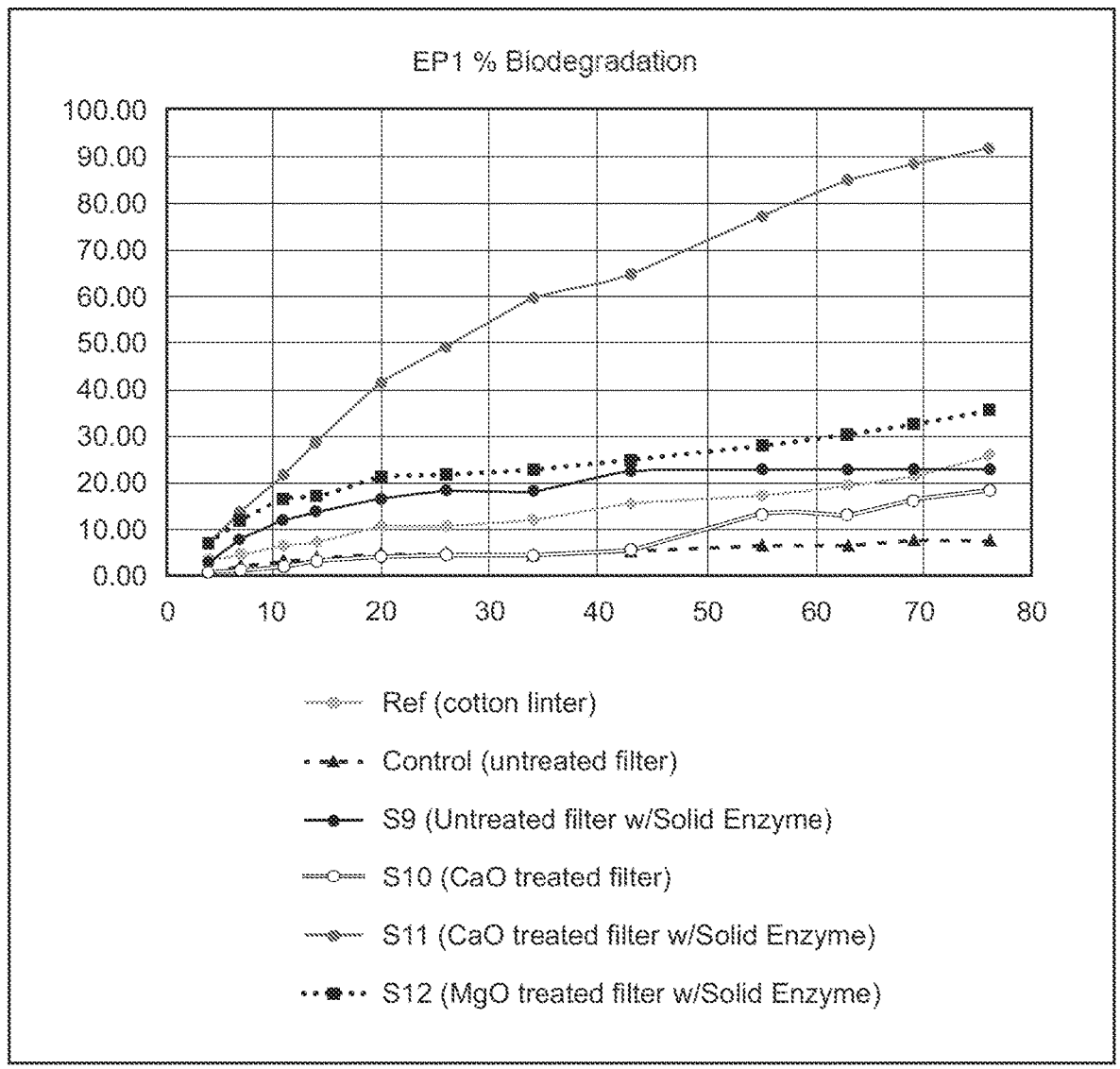
FIG. 3 shows further test results for total degradation in accordance with the present disclosure.

Samples were prepared and tested as above, but with 30 g of ocean sediment per 70 g artificial sea water instead of river water. The results are shown in FIG. 3, and show that the % biodegradation for Samples S9-S12 was greater over a shorter period of time (in days) as compared to the reference (cotton linter) and the control (untreated filter).

Example 7

Figure 4:
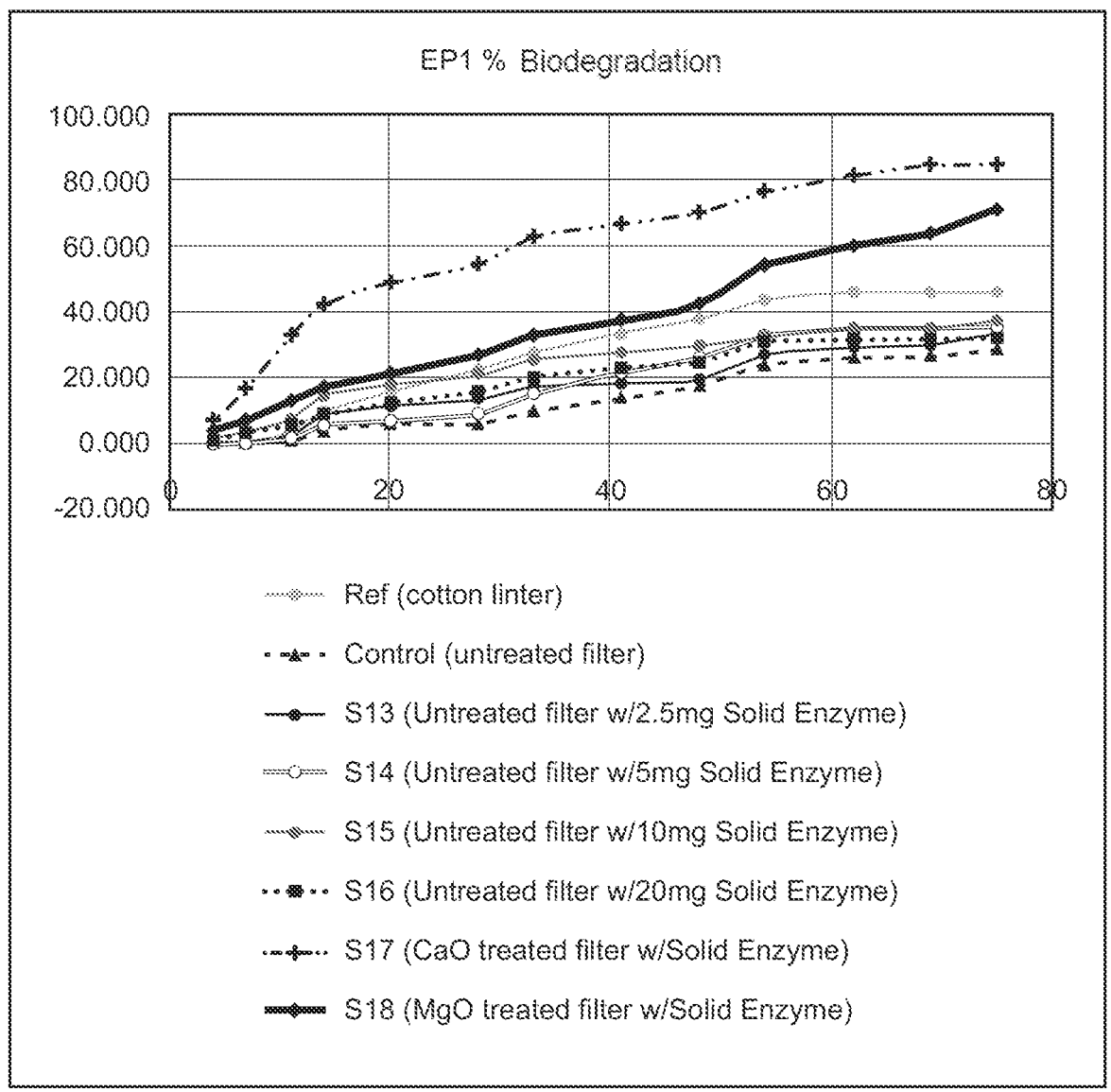
FIG. 4 shows yet further test results for total degradation in accordance with the present disclosure.

Samples were prepared and tested as in Example 5, using river water, and compared different amounts of enzyme included with an untreated filter. The results are shown in FIG. 4. As shown, the % biodegradation over time (in days) increased with increased amounts of enzyme included in an untreated filter.

EMBODIMENTS

Embodiment 1: A degradable cellulose ester article comprising a cellulose ester, wherein at least a portion of the article comprises a basic material, an enzymatic material, or combinations thereof.

Embodiment 2: The degradable cellulose ester article of Embodiment 1, wherein the cellulose ester comprises cellulose acetate, cellulose butyrate, cellulose propionate, cellulose triacetate, cellulose acetate-propionate, cellulose acetate-butyrate, cellulose propionate-butyrate, cellulose nitrate, cellulose sulfate, cellulose phthalate, and combinations thereof.

Embodiment 3: The degradable cellulose ester article of any of Embodiments 1-2, wherein the basic material, enzymatic material, or combinations thereof is provided as a coating on the cellulose ester article.

Embodiment 4: The degradable cellulose ester article of any of Embodiments 1-2, wherein the basic material, enzymatic material, or combinations thereof is provided as a pill within the degradable cellulose ester article.

Embodiment 5: The degradable cellulose ester article of Embodiment 4, wherein the pill comprises a coating.

Embodiment 6: The degradable cellulose ester article of any of Embodiments 1-5, wherein the basic material has a pH of at least 7.4, preferably at least 7.6.

Embodiment 7: The degradable cellulose ester article of any of Embodiments 1-6, wherein the basic material comprises at least one of calcium oxide, calcium hydroxide, magnesium hydroxide, magnesium oxide, or combinations thereof.

Embodiment 8: The degradable cellulose ester article of any of Embodiments 4-7, wherein the pill comprises a basic material and an enzymatic material, and wherein the enzymatic material comprises an esterase, a cellulase, a glucosidase, or combinations thereof.

Embodiment 9: The degradable cellulose ester article of any of Embodiments 4-8, wherein the enzymatic material comprises an esterase.

Embodiment 10: The degradable cellulose ester article of any of Embodiments 5-9, wherein the coating of the pill comprises the basic material.

Embodiment 11: The degradable cellulose ester article of any of Embodiments 5-10, wherein the pill comprises the enzymatic material and wherein the enzymatic material is coated with a second coating material.

Embodiment 12: The degradable cellulose ester article of any of Embodiments 4-11, wherein the pill comprises an enzymatic material comprising an esterase and at least one of a cellulase, a glucosidase, or combinations thereof.

Embodiment 13: The degradable cellulose ester article of any of Embodiments 5-12, wherein the coating material has a water solubility of at least 0.01 g/100 mL at 25° C.

Embodiment 14: The degradable cellulose ester article of any of Embodiments 5-13, wherein the coating material comprises gelatin, polyethylene glycol, polylactic acid, polycaprolactone, polyvinyl pyrrolidone, polyvinyl alcohol, or combinations thereof.

Embodiment 15: The degradable cellulose ester article of any of Embodiments 5-14, wherein the coating material comprises an oligosaccharide, a monosaccharide, a polyhydroxyalkanoate, or combinations thereof.

Embodiment 16: The degradable cellulose ester article of any of Embodiments 5-15, wherein the coating material is free of cellulose acetate.

Embodiment 17: The degradable cellulose ester article of any of Embodiments 11-16, wherein the second coating material comprises gelatin, polyethylene glycol, polylactic acid, polycaprolactone, or combinations thereof.

Embodiment 18: The degradable cellulose ester article of any of Embodiments 11-16, wherein the second coating material comprises an oligosaccharide, a monosaccharide, and/or a polyhydroxyalkanoate.

Embodiment 19: The degradable cellulose ester article of any of Embodiments 4-18, wherein the pill, when exposed to water, deacetylates the bloomed cellulose acetate tow by at least 20% in 20 days or less, preferably by at least 30%, more preferably by at least 60%.

Embodiment 20: A degradable cigarette filter comprising: a filter element comprising bloomed cellulose acetate tow, wherein the cellulose acetate has a degree of substitution (DS) of greater than 1.3; a pill dispersed in the bloomed cellulose acetate tow; and a plug wrap at least partially surrounding the filter element; wherein the pill comprises a coating and at least one of a basic material, an enzymatic material, or a combination thereof, and wherein the pill, when exposed to water, deacetylates the bloomed cellulose acetate tow by at least 10% in 20 days or less.

Embodiment 21: The filter of Embodiment 20, wherein the water solubility of the basic material is less than the water solubility of the coating.

Embodiment 22: The filter of any of Embodiments 20-21, wherein the basic material has a pH of at least 7.4, preferably at least 7.6.

Embodiment 23: The filter of any of Embodiments 20-22, wherein the basic material comprises at least one of calcium oxide, calcium hydroxide, magnesium hydroxide, magnesium oxide, or combinations thereof.

Embodiment 24: The filter of any of Embodiments 20-23, wherein the pill comprises a basic material and an enzymatic material, and wherein the enzymatic material comprises an esterase, a cellulase, a glucosidase, or combinations thereof.

Embodiment 25: The filter of any of Embodiments 20-24, wherein the enzymatic material comprises an esterase.

Embodiment 26: The filter of any of Embodiments 20-25, wherein the coating has a thickness from 0.1 to 100 μm.

Embodiment 27: The filter of any of Embodiments 20-26, wherein the pill has a size, in its largest diameter, from 1 to 10 mm.

Embodiment 28: The filter of any of Embodiments 20-27, wherein the coating of the pill comprises the basic material.

Embodiment 29: The filter of Embodiment 20, wherein the pill comprises the enzymatic material and wherein the enzymatic material is coated with a second coating material.

Embodiment 30: The filter of any of Embodiments 20-29, wherein the pill comprises an enzymatic material comprising an esterase and at least one of a cellulase, a glucosidase, or combinations thereof.

Embodiment 31: The filter of any of Embodiments 20-30, wherein the coating material has a water solubility of at least 0.01 g/100 mL at 25° C.

Embodiment 32: The filter of any of Embodiments 20-31, wherein the coating material comprises gelatin, polyethylene glycol, polylactic acid, polycaprolactone, polyvinyl pyrrolidone, polyvinyl alcohol, or combinations thereof.

Embodiment 33: The filter of any of Embodiments 20-32, wherein the coating material comprises an oligosaccharide, a monosaccharide, a polyhydroxyalkanoate, or combinations thereof.

Embodiment 34: The filter of any of Embodiments 20-33, wherein the coating material is free of cellulose acetate.

Embodiment 35: The filter of Embodiment 29, wherein the second coating material comprises gelatin, polyethylene glycol, polylactic acid, polycaprolactone, polyvinyl pyrrolidone, polyvinyl alcohol or combinations thereof.

Embodiment 36: The filter of Embodiment 29, wherein the second coating material comprises an oligosaccharide, a monosaccharide, and/or a polyhydroxyalkanoate.

Embodiment 37: The filter of any of Embodiments 20-36, wherein the pill, when exposed to water, deacetylates the bloomed cellulose acetate tow by at least 20% in 20 days or less, preferably by at least 30%, more preferably by at least 60%.

Embodiment 38: A degradable cellulose acetate tow, wherein the cellulose acetate tow has a degree of substitution of greater than 1.3 and wherein the cellulose acetate tow further comprises a pill dispersed in the cellulose acetate tow, wherein the pill comprises a coating and at least one of a basic material, an enzymatic material, or a combination thereof, and wherein the pill, when exposed to water, deacetylates the cellulose acetate tow by at least 10% in 20 days or less.

Embodiment 39: A method for forming degradable cellulose acetate tow, the method comprising: a) providing cellulose acetate tow having a degree of substitution of greater than 1.3;
b) dispersing a pill in the cellulose acetate tow, wherein the pill comprises at least one of a basic material, and enzymatic material, or a combination thereof, wherein the pill, when exposed to water, deacetylates the cellulose acetate tow by at least 10% in 20 days or less.

Embodiment 40: The method of Embodiment 39, wherein the pill hydrolyzes the acetate moieties and cleaves glycosidic bonds within the cellulose acetate tow.

Embodiment 41: A method for forming a degradable cellulose ester article, the method comprising: a) providing cellulose ester having a degree of substitution of greater than 1.3; b) dispersing a pill in the cellulose ester, wherein the pill comprises at least one of a basic material, and enzymatic material, or a combination thereof, wherein the pill, when exposed to water, deacetylates the cellulose ester by at least 10% in 20 days or less.

Embodiment 42: A method for forming a degradable cellulose ester article, the method comprising: a) forming a cellulose ester article from a cellulose ester having a degree of substitution of greater than 1.3; and b) providing a coating on at least a portion of the cellulose ester article, wherein the coating comprises a basic material, an enzymatic material, or combinations thereof.

Embodiment 43: A method for forming a degradable cellulose ester article, the method comprising: a) providing a cellulose ester having a degree of substitution of greater than 1.3; b) providing a basic material, an enzymatic material, or combinations thereof; and c) forming a cellulose ester article by at least one of extrusion, thermoforming, blow molding, 3D printing, injection molding, and combinations thereof.

Embodiment 44: A degradable cellulose ester article comprising a cellulose ester and a liquid capsule, wherein the liquid capsule comprises a basic material, an enzymatic material, or combinations thereof.

While the invention has been described in detail, modifications within the spirit and scope of the invention will be readily apparent to those of skill in the art. It should be understood that aspects of the invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only, and is not intended to limit the invention.

We claim:

1. A degradable cellulose acetate article comprising a cellulose acetate having a degree of substitution from 2.2 to 2.65, wherein at least a portion of the article comprises a coating comprising a basic material, an enzymatic material, or combinations thereof; wherein the coating comprises at least 1 wt. % of the basic material, at least 1 wt. % of the enzymatic material, or a combination thereof, based on the total weight of the coating, and wherein the basic material, the enzymatic material, or combinations thereof is dispersed in a portion of the coating not facing or exposed to the environment.

2. The degradable cellulose acetate article of claim 1, wherein the basic material comprises at least one of calcium oxide, calcium hydroxide, magnesium hydroxide, magnesium oxide, or combinations thereof.

3. The degradable cellulose acetate article of claim 1, wherein the coating comprises a basic material and an enzymatic material, and wherein the enzymatic material comprises an esterase, a cellulase, a glucosidase, or combinations thereof.

4. The degradable cellulose acetate article of claim 1, wherein the enzymatic material comprises an esterase.

5. The degradable cellulose acetate article of claim 1, wherein the coating comprises the basic material.

6. The degradable cellulose acetate article of claim 1, wherein the coating comprises the enzymatic material and wherein the enzymatic material is coated with a second coating material.

7. The degradable cellulose acetate article of claim 1, wherein the coating comprises an enzymatic material comprising an esterase and at least one of a cellulase, a glucosidase, or combinations thereof.

8. The degradable cellulose acetate article of claim 1, wherein the coating material has a water solubility of at least 0.01 g/100 mL at 25° C.

9. The degradable cellulose acetate article of claim 1, wherein the coating further comprises gelatin, polyethylene glycol, polylactic acid, polycaprolactone, polyvinyl pyrrolidone, polyvinyl alcohol, or combinations thereof.

10. The degradable cellulose acetate article of claim 1, wherein the coating further comprises an oligosaccharide, a monosaccharide, a polyhydroxyalkanoate, or combinations thereof.

11. The degradable cellulose acetate article of claim 1, wherein the coating is free of cellulose acetate.

12. The degradable cellulose acetate article of claim 1, wherein water solubility of the basic material is less than water solubility of the coating.

13. The degradable cellulose acetate article of claim 1, wherein the coating has a thickness from 0.1 to 100 microns.

\* \* \* \* \*